United States Patent
Zhang et al.

(10) Patent No.: US 11,030,731 B2
(45) Date of Patent: Jun. 8, 2021

(54) SYSTEMS AND METHODS FOR FUSING INFRARED IMAGE AND VISIBLE LIGHT IMAGE

(71) Applicant: ZHEJIANG DAHUA TECHNOLOGY CO., LTD., Zhejiang (CN)

(72) Inventors: Dong Zhang, Hangzhou (CN); Song Wang, Hangzhou (CN)

(73) Assignee: ZHEJIANG DAHUA TECHNOLOGY CO., LTD., Hangzhou (CN)

( * ) Notice: Subject to any disclaimer, the term of this patent is extended or adjusted under 35 U.S.C. 154(b) by 63 days.

(21) Appl. No.: 16/454,210

(22) Filed: Jun. 27, 2019

(65) Prior Publication Data

US 2019/0318463 A1    Oct. 17, 2019

Related U.S. Application Data

(63) Continuation of application No. PCT/CN2017/102756, filed on Sep. 21, 2017.

(30) Foreign Application Priority Data

Dec. 27, 2016    (CN) .......................... 201611230003.X

(51) Int. Cl.
*G06T 5/50* (2006.01)
*G06T 7/90* (2017.01)
(Continued)

(52) U.S. Cl.
CPC ................ *G06T 5/50* (2013.01); *G06T 5/002* (2013.01); *G06T 5/003* (2013.01); *G06T 7/90* (2017.01);
(Continued)

(58) Field of Classification Search
None
See application file for complete search history.

(56) References Cited

U.S. PATENT DOCUMENTS

| 2011/0038535 A1 | 2/2011 | Wang et al. |
| 2013/0058590 A1 | 3/2013 | Weiss |

(Continued)

FOREIGN PATENT DOCUMENTS

| CN | 101231748 A | 7/2008 |
| CN | 101546428 A | 9/2009 |

(Continued)

OTHER PUBLICATIONS

A general framework for multiresolution image fusion: from pixels to regions. Piella (Year: 2002).*

(Continued)

*Primary Examiner* — Delomia L Gilliard
(74) *Attorney, Agent, or Firm* — Metis IP LLC

(57) ABSTRACT

A system and a method for image fusion are provided. The method may comprise: obtaining a visible light image and an infrared image relating to a same scene; performing a first decomposition to the visible light image to obtain a first high-frequency component of the visible light image and a first low-frequency component of the visible light image; performing a first decomposition to the infrared image to obtain a first high-frequency component of the infrared image and a first low-frequency component of the infrared image; fusing the first high-frequency component of the visible light image and the first high-frequency component of the infrared image based on a first algorithm to generate a first fused high-frequency component; and performing reconstruction based on the first fused high-frequency component, the first low-frequency component of the visible (Continued)

light image, and the first low-frequency component of the infrared image to generate a fused image.

20 Claims, 18 Drawing Sheets

(51) Int. Cl.
*G06T 5/00* (2006.01)
*G06T 11/00* (2006.01)
(52) U.S. Cl.
CPC ... *G06T 11/001* (2013.01); *G06T 2207/10004* (2013.01); *G06T 2207/10016* (2013.01); *G06T 2207/10048* (2013.01); *G06T 2207/20182* (2013.01); *G06T 2207/20221* (2013.01)

(56) References Cited

U.S. PATENT DOCUMENTS

| | | | |
|---|---|---|---|
| 2016/0155218 A1* | 6/2016 | Svensson | G06T 5/40 382/165 |
| 2018/0227509 A1 | 8/2018 | Huang et al. | |
| 2019/0114747 A1* | 4/2019 | Treibitz | G06T 5/003 |

FOREIGN PATENT DOCUMENTS

| | | |
|---|---|---|
| CN | 102968772 A | 3/2013 |
| CN | 103955905 A | 7/2014 |
| CN | 104835130 A | 8/2015 |
| CN | 105069769 A | 11/2015 |
| WO | 2018120936 A1 | 7/2018 |

OTHER PUBLICATIONS

The Extended European Search Report n. European Application No. 17887950.8 dated Jan. 21, 2020, 13 pages.
Sungmin Lee et al., A Review on Dark Channel Prior Based Image Dehazing Algorithms, EURASIP Journal on Image and Video Processing, 2016, 23 pages.
Zhang Erhu et al., A fast Video Image Defogging Algorithm Based on Dark Channel Prior, 2013 6th International Congress on Image and Signal Processing (CISP), IEEE, pp. 219-223, 2013.
Liao Wenzhi et al., Two-stage Fusion of Thermal Hyperspectral and Visible RGB Image by PCA and Guided Filter, 2015 7th Workshop on Hyperspectral Image and Signal Processing: Evolution in Remote Sensing (WHISPERS), pp. 1-4, 2015.
Lisa Gottesfeld Brown, A Survey of Image Registration Techniques, ACM Computing Surveys, 24(4): 325-376, 1992.
G. Piella, A General Framework for Multiresolution Image Fusion: from Pixels to Regions, Information Fusion, 4: 259-280, 2003.
E. H. Adelson et al., Pyramid Methods in Image Processing, RCA Engineer, 29(6): 33-41, 1984.
P. J. Burt, The Laplacian Pyramid as a Compact Image Code, IEEE Transactions on Communication, 31(4):532-540, 1983.
O. Rockinger et al., Pixel-Level Image Fusion: The Case of Image Sequences, Visual Communications and Image Processing, 3374:378-388, 1998.
Partial Supplementary Search Report in European Application No. 17887950.8 dated Oct. 10, 2019, 11 pages.
International Search Report in PCT/CN2017/102756 dated Jan. 3, 2018, 4 pages.
Written Opinion in PCT/CN2017/102756 dated Jan. 3, 2018, 5 pages.

* cited by examiner

SYSTEMS AND METHODS FOR FUSING INFRARED IMAGE AND VISIBLE LIGHT IMAGE

CROSS-REFERENCE TO RELATED APPLICATIONS

This application is a Continuation Application of International Application No. PCT/CN2017/102756, filed on Sep. 21, 2017, which claims priority of Chinese Application No. 201611230003.X filed on Dec. 27, 2016, the entire contents of each of which are hereby incorporated by reference.

TECHNICAL FIELD

The present disclosure generally relates to methods, systems, and media for image fusion. More particularly, the present disclosure relates to methods, systems, and media for fusing a visible light image and an infrared image.

BACKGROUND

Visible light image detection has been widely used in security and surveillance fields. Generally, the visible light images are generated by capturing reflectance of objects included in a scene. The reflectance may indicate some details of the objects under a certain luminance. However, under a low luminance, a visible light image may contain noise that may weaken the contrast of the visible light image. An infrared image may be used to solve the problem. An infrared image is captured based on infrared light reflection. An infrared image may contain less noise under low luminance. However, the quality of an infrared image of an object may be affected by the material and color of the object in the scene because the material and color of the object may influence the reflectance of the infrared light by the object. Therefore, the combination of a visible light image and an infrared image based on their complementary features with an image fusion technique may provide a high-quality image under low luminance.

SUMMARY

In some aspects of the present disclosure, a system for image fusion is provided. The system may include a processor and a storage. The storage may store instructions. The instructions, when executed by the processor, may cause the processor to effectuate the method. The method may comprise: obtaining a visible light image and an infrared image relating to a same scene; performing a first decomposition to the visible light image to obtain a first high-frequency component of the visible light image and a first low-frequency component of the visible light image; performing a first decomposition to the infrared image to obtain a first high-frequency component of the infrared image and a first low-frequency component of the infrared image; fusing the first high-frequency component of the visible light image and the first high-frequency component of the infrared image based on a first algorithm to generate a first fused high-frequency component; and performing reconstruction based on the first fused high-frequency component, the first low-frequency component of the visible light image, and the first low-frequency component of the infrared image to generate a fused image.

In some embodiments, the image fusion system may further caused to effectuate the method to preprocess the visible light image and the infrared image. The preprocessing may comprise: registering the visible light image and the infrared image; performing haze removal on the visible light image; and performing color filtering on the visible light image.

In some embodiments, the performing haze removal on the visible light image may comprise: determining a dark channel matrix; determining an atmospheric light; determining an initial transmittance based on the dark channel matrix and the atmospheric light; determining a bright area to obtain an optimized transmittance based on the initial transmittance; and performing the haze removal based on the optimized transmittance.

In some embodiments, the first decomposition may be pyramid decomposition.

In some embodiments, the pyramid decomposition may comprise: performing low-pass filtering on a subject image to obtain a filtered image; downsampling the filtered image to obtain a downsampled image; upsampling the downsampled image to obtain an upsampled image; and performing band-pass filtering on the upsampled image to obtain a decomposed subject image.

In some embodiments, the subject image may comprise the first high-frequency component of the visible light image, the first low-frequency component of the visible light image, the first high-frequency component of the infrared image, or the first low-frequency component of the infrared image.

In some embodiments, the image fusion system may further caused to effectuate the method including fusing the first low-frequency component of the visible light image and the first low-frequency component of the infrared image. The fusing may include: determining a difference between the first low-frequency component of the visible light image and the first low-frequency component of the infrared image; determining whether the difference exceeds a threshold; and determining a first low-frequency component based on the result of the determination. In response to the determination that the difference exceeds the threshold, the low-frequency component of the visible light image may be designated as the first fused low-frequency component. In response to the determination that the difference is lower than the threshold, the first fused low-frequency component may be determined based on a second algorithm.

In some embodiments, the fusing the first high-frequency component of the visible light image and the first high-frequency component of the infrared image may include determining the first fused high-frequency component based on a third algorithm.

In some embodiments, the performing the reconstruction may include performing an inverse pyramid decomposition based on the first fused low-frequency component and the first fused high-frequency component.

In some embodiments, the image fusion system may further caused to effectuate the method including filtering the first high-frequency component of the visible light image by performing mapping and median filtering.

In some embodiments, the image fusion system may further caused to effectuate the method including amplifying the first high-frequency component of the infrared image.

In some embodiments, the image fusion system may further caused to effectuate the method including: performing a second decomposition to the first low-frequency component of the visible light image to obtain a second high-frequency component of the visible light image and a second low-frequency component of the visible light image; performing a second decomposition to the first low-frequency component of the infrared image to obtain a second high-frequency component of the infrared image and a second low-frequency component of the infrared image; and fusing the second high-frequency component of the visible light image and the second high-frequency component of the infrared image based on the first algorithm to generate a second fused high-frequency component.

In some embodiments, the performing the reconstruction may further include: fusing the second low-frequency component of the visible light image and the second low-frequency component of the infrared image based on the second algorithm to generate a second fused low-frequency component; and generating the fused image based on the first fused high-frequency component, the second fused high-frequency component, and the second fused low-frequency component.

In another aspect of the present disclosure, an image fusion method is provided. The method may comprise: obtaining a visible light image and an infrared image relating to a same scene; performing a first decomposition to the visible light image to obtain a first high-frequency component of the visible light image and a first low-frequency component of the visible light image; performing a first decomposition to the infrared image to obtain a first high-frequency component of the infrared image and a first low-frequency component of the infrared image; fusing the first high-frequency component of the visible light image and the first high-frequency component of the infrared image based on a first algorithm to generate a first fused high-frequency component; and performing reconstruction based on the first fused high-frequency component, the first low-frequency component of the visible light image, and the first low-frequency component of the infrared image to generate a fused image.

In a further aspect of the present disclosure, a non-transitory computer readable medium is provided. The non-transitory computer readable medium may store instructions. The instructions, when executed by a computing device, may cause the computing device to implement a method, comprising: obtaining a visible light image and an infrared image relating to a same scene; performing a first decomposition to the visible light image to obtain a first high-frequency component of the visible light image and a first low-frequency component of the visible light image; performing a first decomposition to the infrared image to obtain a first high-frequency component of the infrared image and a first low-frequency component of the infrared image; fusing the first high-frequency component of the visible light image and the first high-frequency component of the infrared image based on a first algorithm to generate a first fused high-frequency component; and performing reconstruction based on the first fused high-frequency component, the first low-frequency component of the visible light image, and the first low-frequency component of the infrared image to generate a fused image.

In a further aspect of the present disclosure, a system implemented on at least one device each of which has at least one processor and storage is provided. The system may include an image acquisition module, a decomposition module, a processing module, and a reconstruction module. The image acquisition module may be configured to obtain a visible light image and an infrared image relating to a same scene. The decomposition module may be configured to perform a first decomposition to the visible light image to obtain a first high-frequency component of the visible light image and a first low-frequency component of the visible light image, and perform a first decomposition to the infrared image to obtain a first high-frequency component of the infrared image and a first low-frequency component of the infrared image. The processing module may be configured to fuse the first high-frequency component of the visible light image and the first high-frequency component of the infrared image based on a first algorithm to generate a first fused high-frequency component. The reconstruction module may be configured to perform reconstruction based on the first fused high-frequency component, the first low-frequency component of the visible light image, and the first low-frequency component of the infrared image to generate a fused image.

In some embodiments, the decomposition module may include a low-pass filtering unit, a downsampling unit, an upsampling unit and a band-pass filtering unit. The low-pass filtering unit may be configured to perform low-pass filtering on a subject image to obtain a filtered image. The downsampling unit may be configured to downsample the filtered image to obtain a downsampled image. The upsampling unit may be configured to upsample the downsampled image to obtain an upsampled image. The band-pass filtering unit may be configured to perform band-pass filtering on the upsampled image to obtain a decomposed subject image.

In some embodiments, the decomposition module may be further configured to: perform a second decomposition to the first low-frequency component of the visible light image to obtain a second high-frequency component of the visible light image and a second low-frequency component of the visible light image; and perform a second decomposition to the first low-frequency component of the infrared image to obtain a second high-frequency component of the infrared image and a second low-frequency component of the infrared image. The processing module may be further configured to fuse the second high-frequency component of the visible light image and the second high-frequency component of the infrared image based on the first algorithm to generate a second fused high-frequency component.

In some embodiments, the reconstruction module may be further configured to: fuse the second low-frequency component of the visible light image and the second low-frequency component of the infrared image based on a second algorithm to generate a second fused low-frequency component; and generate the fused image based on the first fused high-frequency component, the second fused high-frequency component, and the second fused low-frequency component.

BRIEF DESCRIPTION OF THE DRAWINGS

The disclosure will be understood more fully from the detailed description given below and from the accompanying drawings of various embodiments of the disclosure. The drawings, however, should not be taken to limit the disclosure to the specific embodiments, but are for explanation and understanding only.

DETAILED DESCRIPTION

In the following detailed description, numerous specific details are set forth by way of examples in order to provide a thorough understanding of the relevant disclosure. However, it should be apparent to those skilled in the art that the present disclosure may be practiced without such details. In other instances, well known methods, procedures, systems, components, and/or circuitry have been described at a relatively high-level, without detail, in order to avoid unnecessarily obscuring aspects of the present disclosure. Various modifications to the disclosed embodiments will be readily apparent to those skilled in the art, and the general principles defined herein may be applied to other embodiments and applications without departing from the spirit and scope of the present disclosure. Thus, the present disclosure is not limited to the embodiments shown, but to be accorded the widest scope consistent with the claims.

It will be understood that the term "system," "unit," "module," and/or "engine" used herein are one method to distinguish different components, elements, parts, section or assembly of different level in ascending order. However, the terms may be displaced by other expression if they may achieve the same purpose.

Figure 2:
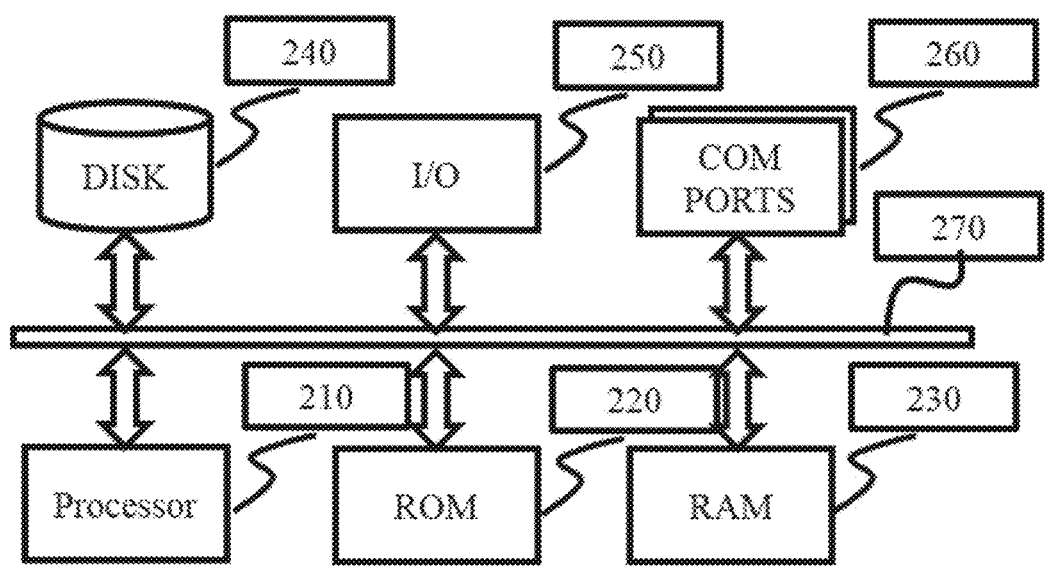
FIG. 2 is a block diagram illustrating an exemplary computing device according to embodiments of the present disclosure of the present disclosure.

Generally, the word "module," "unit," or "block," as used herein, refers to logic embodied in hardware or firmware, or to a collection of software instructions. A module, a unit, or a block described herein may be implemented as software and/or hardware and may be stored in any type of non-transitory computer-readable medium or other storage device. In some embodiments, a software module/unit/block may be compiled and linked into an executable program. It will be appreciated that software modules can be callable from other modules/units/blocks or from themselves, and/or may be invoked in response to detected events or interrupts. Software modules/units/blocks configured for execution on computing devices (e.g., processor 210 as illustrated in FIG. 2) may be provided on a computer readable medium, such as a compact disc, a digital video disc, a flash drive, a magnetic disc, or any other tangible medium, or as a digital download (and can be originally stored in a compressed or installable format that needs installation, decompression, or decryption prior to execution). Such software code may be stored, partially or fully, on a storage device of the executing computing device, for execution by the computing device. Software instructions may be embedded in a firmware, such as an EPROM. It will be further appreciated that hardware modules/units/blocks may be included of connected logic components, such as gates and flip-flops, and/or can be included of programmable units, such as programmable gate arrays or processors. The modules/units/blocks or computing device functionality described herein may be implemented as software modules/units/blocks, but may be represented in hardware or firmware. In general, the modules/units/blocks described herein refer to logical modules/units/blocks that may be combined with other modules/units/blocks or divided into sub-modules/sub-units/sub-blocks despite their physical organization or storage.

It will be understood that when a unit, module or engine is referred to as being "on," "connected to" or "coupled to" another unit, module, or engine, it may be directly on, connected or coupled to, or communicate with the other unit, module, or engine, or an intervening unit, module, or engine may be present, unless the context clearly indicates otherwise. As used herein, the term "and/or" includes any and all combinations of one or more of the associated listed items.

The terminology used herein is for the purposes of describing particular examples and embodiments only, and is not intended to be limiting. As used herein, the singular forms "a," "an," and "the" may be intended to include the plural forms as well, unless the context clearly indicates otherwise. It will be further understood that the terms "include," and/or "comprise," when used in this disclosure, specify the presence of integers, devices, behaviors, stated features, steps, elements, operations, and/or components, but do not exclude the presence or addition of one or more other integers, devices, behaviors, features, steps, elements, operations, components, and/or groups thereof.

Figure 1:
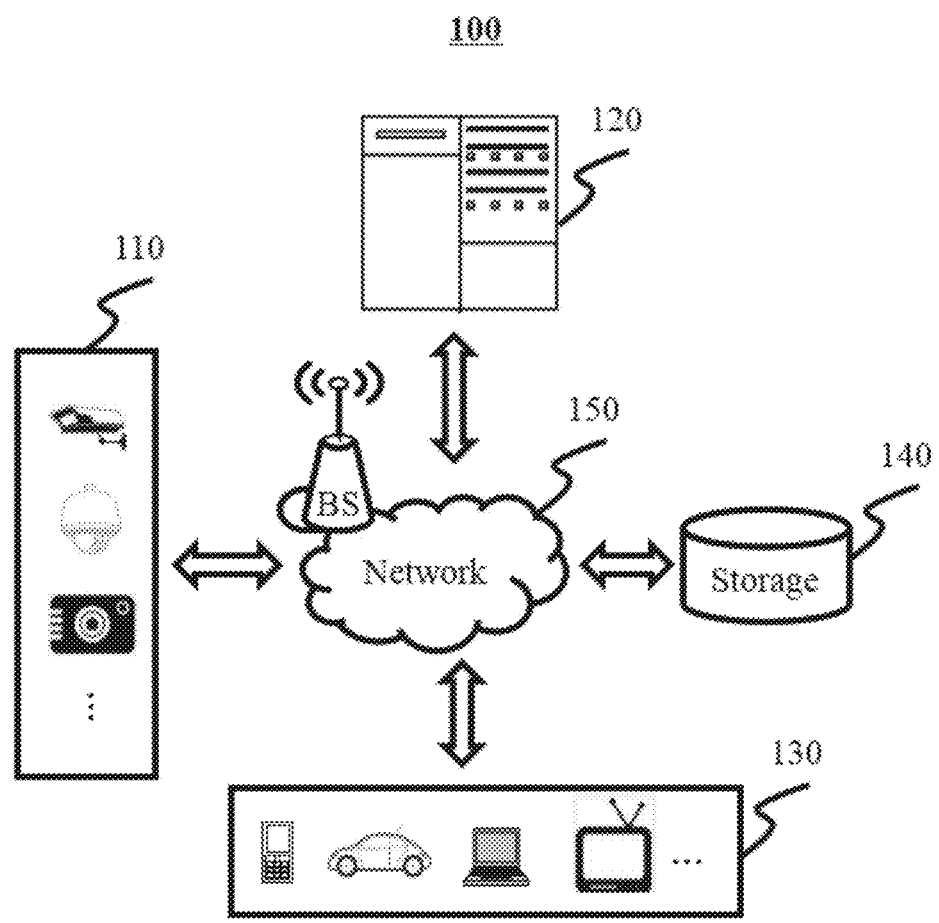
FIG. 1 is a schematic diagram illustrating an exemplary image fusion system according to some embodiments of the present disclosure.

FIG. 1 is a schematic diagram illustrating an exemplary image fusion system 100 according to some embodiments of the present disclosure. The image fusion system 100 may include an image acquisition device 110, a processing device 120, a terminal 130, a storage 140, a network 150, and/or any other suitable component for image processing in accordance with various embodiments of the disclosure.

The image acquisition device 110 may be used to acquire images. The image may include a visible light image, an infrared image, or the like, or a combination thereof. The visible image and the infrared image may correspond to a same static scene or a same dynamic scene. In some embodiments, the images may include a still image, a motion image, a video (offline or live streaming), a frame of a video, or the like, or a combination thereof.

The image acquisition device 110 may be any suitable device that is capable of capturing an image. The image acquisition device 110 may be and/or include a camera, a sensor, a video recorder, or the like, or any combination thereof. The image acquisition device 110 may be and/or include any suitable type of camera, such as a fixed camera, a fixed dome camera, a covert camera, a Pan-Tilt-Zoom (PTZ) camera, a thermal camera, etc. The image acquisition device 110 may be and/or include any suitable type of sensor, such as an audio sensor, a light sensor, a wind speed sensor, or the like, or a combination thereof.

In some embodiments, a light sensor (e.g., a visible light detector, an infrared detector, etc.) may obtain a light signal, such as an infrared signal. The light signal may provide supplementary information for processing images captured by the image acquisition device 110. For example, a visible light image captured by a visible light camera may provide a high-resolution visible light reflection image. A penetrating infrared signal may provide disguised information to supplement the visible light image.

Data obtained by the image acquisition device 110 (e.g., images, light signals, etc.) may be stored in the storage 140, sent to the processing device 120 or the terminal 130 via the network 150. In some embodiments, the image acquisition device 110 may be integrated in the terminal 130.

The processing device 120 may process images and/or data relating to one or more functions described in the present disclosure. For example, the processing device 120 may process images received from the image acquisition device 110 and output processed images to the storage 140 and/or the terminal 130 through the network 150. In some embodiments, the processing device 120 may include a central processing unit (CPU), an application-specific integrated circuit (ASIC), an application-specific instruction-set processor (ASIP), a graphics processing unit (GPU), a physics processing unit (PPU), a digital signal processor (DSP), a field programmable gate array (FPGA), a programmable logic device (PLD), a controller, a microcontroller unit, a reduced instruction-set computer (RISC), a microprocessor, or the like, or any combination thereof. In some embodiments, the processing device 120 may be integrated in the terminal 130.

The terminal 130 may receive, output, display, and/or process images. For example, the terminal 130 may receive images from the image acquisition device 110, the processing device 120, the storage 140, the network 150, etc. As another example, the terminal 130 may output or display a visible light image and/or an infrared image received from the image acquisition device 110 and/or a fused image received from the processing device 120 via the network 150 to a user. As another example, the terminal 130 may process images received from the image acquisition device 110, the processing device 120, the storage 140, the network 150, etc.

The terminal 130 may be connected to or communicate with the processing device 120. The terminal 130 may allow one or more operators (e.g., a law enforcement officer, etc.) to control the production and/or display of the data (e.g., the image captured by the image acquisition device 110) on a display. The terminal 130 may include an input device, an output device, a control panel, a display (not shown in FIG. 1), or the like, or a combination thereof.

An input device may be a keyboard, a touch screen, a mouse, a remote controller, a wearable device, or the like, or a combination thereof. The input device may include alpha-numeric and other keys that may be inputted via a keyboard, a touch screen (e.g., with haptics or tactile feedback, etc.), a speech input, an eye tracking input, a brain monitoring system, or any other comparable input mechanism. The input information received through the input device may be communicated to the processing device 120 via the network 150 for further processing. Another type of the input device may include a cursor control device, such as a mouse, a trackball, or cursor direction keys to communicate direction information and command selections to, for example, the processing device 120 and to control cursor movement on display or another display device.

A display may display the data received (e.g., the image captured by the image acquisition device 110). The information may include data before and/or after data processing, a request for input or parameter relating to image acquisition and/or processing, or the like, or a combination thereof. The display may include a liquid crystal display (LCD), a light emitting diode (LED)-based display, a flat panel display or curved screen (or television), a cathode ray tube (CRT), or the like, or a combination thereof.

The storage 140 may acquire and/or store information of the components (e.g., the image acquisition device 110, the processing device 120, or the terminal 130, etc.) of the image fusion system 100. For example, the storage 140 may acquire and store images from the processing device 120. In some embodiments, the information acquired and/or stored may include programs, software, algorithms, functions, files, parameters, data, texts, numbers, images, or the like, or any combination thereof. In some embodiments, the storage 140 may store visible light images and/or infrared images received from the image acquisition device 110 and fused images received from the processing device 120 with different formats including, for example, bmp, jpg, png, tiff, gif, pcx, tga, exif, fpx, svg, psd, cdr, pcd, dxf, ufo, eps, ai, raw, WMF, or the like, or any combination thereof. In some embodiments, the storage 140 may store algorithms (e.g., a haze removal algorithm, a guided filter algorithm, etc.) applied in the processing device 120. In some embodiments, the storage 140 may include a mass storage, a removable storage, a volatile read-and-write memory, a read-only memory (ROM), or the like, or any combination thereof. Exemplary mass storage may include a magnetic disk, an optical disk, a solid-state drive, etc. Exemplary mass storage may include a magnetic disk, an optical disk, a solid-state drives, etc.

The network 150 may facilitate exchange of information. In some embodiments, one or more components in the image fusion system 100 (e.g., the image acquisition device 110, the terminal 130, the processing device 120 and the storage 140) may send information to other component(s) in the image fusion system 100 via the network 150. For example, the storage 140 may receive and store a visible light and/or an infrared image via the network 150. In some embodiments, the network 150 may be any type of a wired or wireless network, or a combination thereof. Merely by way of example, the network 150 may include a cable network, a wire line network, an optical fiber network, a telecommunication network, an intranet, an Internet, a local area network (LAN), a wide area network (WAN), a wireless local area network (WLAN), a metropolitan area network (MAN), a wide area network (WAN), a public telephone switched network (PSTN), a Bluetooth network, a ZigBee network, a near field communication (NFC) network, or the like, or any combination thereof.

It should be noted that the description above in relation to the image fusion system 100 is provided for the purposes of illustration, and not intended to limit the scope of the present disclosure. For persons having ordinary skills in the art, various variations and modifications may be conducted under the guidance of the present disclosure. However, those variations and modifications do not depart the scope of the present disclosure. For example, the image acquisition device 110 may be integrated in the terminal 130. In some embodiments, part or all of the image data generated by the image acquisition device 110 may be processed by the terminal 130. In some embodiments, the image acquisition device 110 and the processing device 120 may be implemented in one single device configured to perform the functions of the image acquisition device 110 and the processing device 120 described in this disclosure. In some embodiments, the terminal 130 and the storage 140 may be part of the processing device 120 as a single device. Similar modifications should fall within the scope of the present disclosure.

FIG. 2 is a block diagram illustrating an exemplary computing device 200 according to embodiments of the present disclosure of the present disclosure. The processing device 120 and/or the terminal 130 may be implemented using one or more computing devices 200 and/or one or more portions of computing devices 200.

The computing device 200 may be used to implement an image fusion system 100 for the present disclosure. The computing device 200 may implement any component of the image fusion system 100 as described herein. In FIGS. 1 and 2, only one such computer device is shown purely for convenience purposes. One of ordinary skill in the art would understand at the time of filing of this application that the computer functions relating to the data storage system as described herein may be implemented in a distributed fashion on a number of similar platforms, to distribute the processing load.

Referring back to FIG. 2, the computing device 200 may include a processor 210, a read only memory (ROM) 220, a random-access memory (RAM) 230, a disk 240, an input/output (I/O) component 250, COM ports 260, and an internal communication bus 270.

The processor 210 may execute instructions and/or data to perform one or more functions described in the present disclosure. For example, the processor 210 may determine whether a visible light image and an infrared image relating to a same scene are registered. As another example, the processor 210 may register a visible light image and an infrared image relating to a same scene. In some embodiments, the processor 210 may include one or more processors (e.g., single-core processor(s) or multi-core processor(s)). Merely by way of example, the processor 210 may include a central processing unit (CPU), an application-specific integrated circuit (ASIC), an application-specific instruction-set processor (ASIP), a graphics processing unit (GPU), a physics processing unit (PPU), a digital signal processor (DSP), a field programmable gate array (FPGA), a programmable logic device (PLD), a controller, a microcontroller unit, a reduced instruction-set computer (RISC), a microprocessor, or the like, or any combination thereof.

Merely for illustration, only one processor 210 is described in the computing device 200. However, it should be noted that the computing device 200 in the present disclosure may also include multiple processors, thus operations and/or method steps that are performed by one processor 210 as described in the present disclosure may also be jointly or separately performed by the multiple CPUs/processors. For example, if in the present disclosure the processor 210 of the computing device 200 executes both step A and step B, it should be understood that step A and step B may also be performed by two different CPUs/processors jointly or separately in the computing device 200 (e.g., the first processor executes step A and the second processor executes step B, or the first and second processors jointly execute steps A and B).

The ROM 220, the RAM 230, and/or the disk 240 may store data and/or instructions that may perform one or more functions described in the present disclosure. For example, the ROM 220, the RAM 230, and/or the disk 240 may store instructions executed by the processor 210 to determine whether a visible light image and an infrared image relating to a same scene are registered. As another example, the ROM 220, the RAM 230, and/or the disk 240 may store instructions executed by the processor 210 to register a visible light image and an infrared image relating to a same scene. In some embodiments, the RAM 230 may include a dynamic RAM (DRAM), a double date rate synchronous dynamic RAM (DDR SDRAM), a static RAM (SRAM), a thyristor RAM (T-RAM), and a zero-capacitor RAM (Z-RAM), or the like, or any combination thereof. In some embodiments, the ROM 220 may include a mask ROM (MROM), a programmable ROM (PROM), an erasable programmable ROM (EPROM), an electrically-erasable programmable ROM (EEPROM), a compact disk ROM (CD-ROM), and a digital versatile disk ROM, or the like, or any combination thereof. In some embodiments, the disk 240 may include a magnetic disk, an optical disk, a solid-state drive, a flash drive, a floppy disk, an optical disk, a memory card, a zip disk, a magnetic tape, or the like, or any combination thereof. In some embodiments, the ROM 220, the RAM 230, and/or the disk 240 may include a data storage, an application, etc. In some embodiments, the data storage may be any hardware or software for storing data, including a circuitry, a program, etc. In some embodiments, the application may include any application that may be installed in the computing device 200 for querying data.

The I/O 250 may support an input/output between the computing device 200. Merely by way of example, the I/O 250 may include a display, a keypad/keyboard, or the like, or any combination thereof. The display may be an output device for presenting information in visual form. In some embodiments, the display may include a liquid crystal display (LCD) panel, a light emitting diode display (LED) panel, an organic light emitting diodes (OLED) panel, a cathode ray tube (CRT) display, a plasma display, a touchscreen, a simulated touchscreen, the like, or any combination thereof. The keypad/keyboard may be an input device for typing in information from a user. In some embodiments, the keypad/keyboard may include a standard alphanumeric keyboard, a simplified alphanumeric keyboard, a flexible keyboard, a handheld keyboard, a software keyboard, an on-screen keyboard, a laser projection keyboard, a sense board, or the like, or any combination thereof.

The COM ports 260 may be connected to and from a network connected thereto to facilitate data communications. In some embodiments, the COM ports 260 may be interface with the network 150 and/or one or more components in the image fusion system 100. In some embodiments, the COM ports 260 may be any type of wired or wireless network interface. Merely by way of example, the COM ports 260 may include a cable network interface, a wireline network interface, an optical fiber network interface, a telecommunications network interface, an intranet interface, an internet interface, a local area network (LAN) interface, a wide area network (WAN) interface, a wireless local area network (WLAN) interface, a metropolitan area network (MAN) interface, a wide area network (WAN) interface, a public telephone switched network (PSTN) interface, a Bluetooth network interface, a ZigBee network interface, a near field communication (NFC) network interface, or the like, or any combination thereof. In some embodiments, the COM ports 260 may be implemented according to programming and/or computer language(s). The COM ports 260 may include circuitry for coupling the computing device 200 to one or more networks, and is constructed for use with one or more communication protocols and technologies including, global system for mobile communications (GSM), code-division multiple access (CDMA), time-division multiple access (TDMA), general packet radio service (GPRS), enhanced data rate for GSM evolution (EDGE), wideband code division multiple access (WCDMA), high speed downlink packet access (HSDPA), long term evolution (LTE), user datagram protocol (UDP), transmission control protocol/Internet protocol (TCP/IP), short message service (SMS), wireless application protocol (WAP), ultra wide band (UWB), IEEE 802.16 worldwide interoperability for microwave access (WiMax), session initiated protocol/real-time transport protocol (SIP/RTP), or any of a variety of other wireless communication protocols.

The internal communication bus 270 may transfer information and/or data between one or more components of the computing device 200. For example, the internal communication bus 270 may connect the processor 210 with a storage (e.g., the RAM 230, the ROM 220, etc.) for exchanging information and/or data. In some embodiments, the internal communication bus 270 may include a hardware component and/or a software implementation. For example, the internal communication bus 270 may include a wire, an optical fiber, a cable, a communication protocol, or the like, or any combination thereof.

Figure 3:
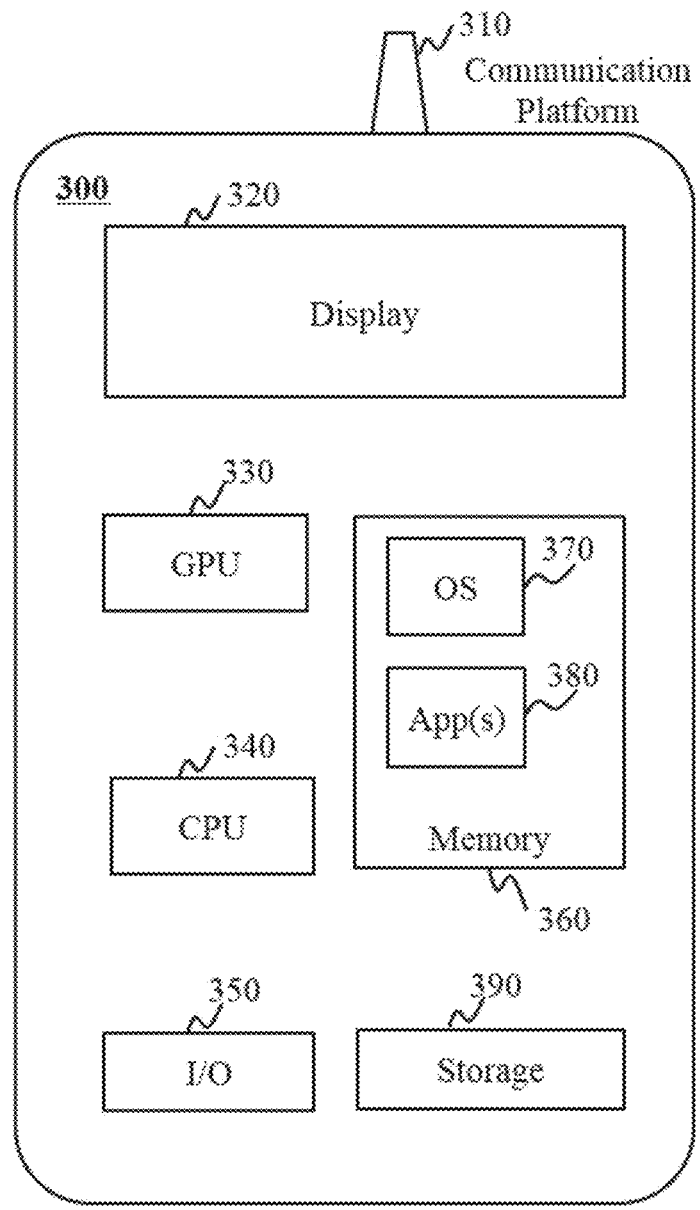
FIG. 3 is a schematic diagram illustrating exemplary hardware and/or software components of an exemplary mobile device on which a terminal may be implemented according to some embodiments of the present disclosure.

FIG. 3 is a schematic diagram illustrating exemplary hardware and/or software components of an exemplary mobile device 300 on which a terminal 130 may be implemented according to some embodiments of the present disclosure. As illustrated in FIG. 3, the mobile device 300 may include a communication platform 310, a display 320, a graphic processing unit (GPU) 330, a central processing unit (CPU) 340, an I/O 350, a memory 360, and a storage 390. In some embodiments, any other suitable component, including but not limited to a system bus or a controller (not shown), may also be included in the mobile device 300. In some embodiments, a mobile operating system 370 (e.g., iOS™, Android™ Windows Phone™, etc.) and one or more applications 380 may be loaded into the memory 360 from the storage 390 in order to be executed by the CPU 340. The applications 380 may include a browser or any other suitable mobile apps for receiving and rendering information relating to the processing device 120. User interactions with the information stream may be achieved via the I/O 350 and provided to the processing device 120 and/or other components of the image fusion system 100 via the network 150.

To implement various modules, units, and their functionalities described in the present disclosure, computer hardware platforms may be used as the hardware platform(s) for one or more of the elements described herein. A computer with user interface elements may be used to implement a personal computer (PC) or any other type of work station or terminal device. A computer may also act as a server if appropriately programmed.

Figure 4:
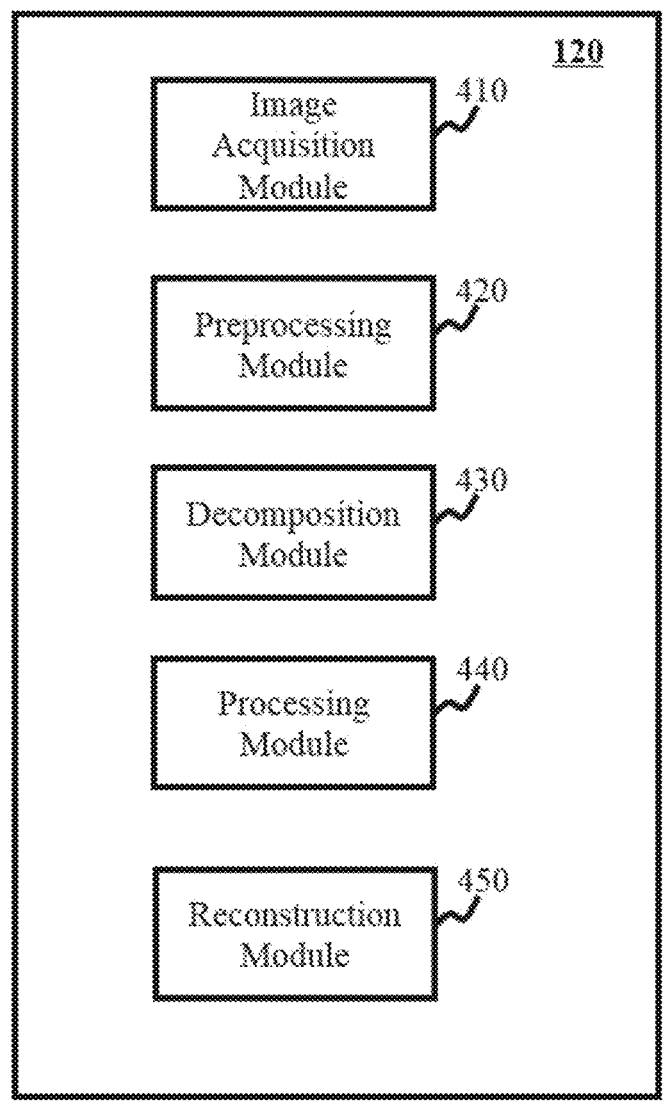
FIG. 4 is a block diagram illustrating an exemplary image fusion system according to some embodiments of the present disclosure.

FIG. 4 is a block diagram illustrating an exemplary processing device according to some embodiments of the present disclosure. In some embodiments, the processing device 120 may include an image acquisition module 410, a preprocessing module 420, a decomposition module 430, a processing module 440, and a reconstruction module 450. Two modules in the processing device 120 may have a wired or wireless connection. A module may be local, remote, or a combination of the two. The processing device 120 may be implemented on a computing device as illustrated in FIG. 2 or a mobile device as illustrated in FIG. 3.

The image acquisition module 410 may obtain images. The images may include a visible light image, an infrared image, a thermal image, an ultrasound image, an X-ray image, or the like. In some embodiments, the image acquisition module 410 may also obtain pixel information and/or some instructions regarding, for example, algorithms for image preprocessing, decomposition, processing, image reconstruction, etc. The image acquisition module 410 may obtain the images and information relating to the images received from the terminal 130 and/or the storage 140 via the network 150. The scene may include a person, the sky, a body of water, a landscape, a street, a part of a vehicle, etc. The visible light image may be acquired by a visible light camera that may detect visible light. The infrared image may be acquired by an infrared camera that may detect infrared light. The infrared image may include a false-color infrared image, a black-and-white infrared image, etc. In some embodiments, the images may be taken under various illumination conditions such as 0.5 Lux, 50 Lux, 100 Lux, 500 Lux, 1000 Lux, 10000 Lux, 60000 Lux, 100000 Lux, etc. Herein, Lux is the unit of illumination. The image acquisition module 410 may send the obtained visible light image and/or the infrared image to the preprocessing module 420.

The preprocessing module 420 may preprocess the visible light image and/or the infrared image obtained from the image acquisition module 410. Exemplary preprocessing may include reducing the noise in an image by filtering. The filtering may include spatial filtering, frequency domain filtering, or the like, or a combination thereof. The spatial filtering, based on pixels of the image, may include linear filtering (e.g., mean filtering, Gaussian filtering, Wiener filtering, etc.) and non-linear filtering (e.g., median filtering, etc.). In some embodiments, the preprocessing module 420 may perform color filtering on the visible light image and/or the infrared image. In some embodiments, the preprocessing module 420 may registering the visible light image with the infrared image. In some embodiments, the preprocessing module 420 may perform haze removal on the visible light image. The preprocessing module 420 may send the preprocessed images to the decomposition module 430, the storage 140, the processing device 120, the terminal 130, etc. Descriptions about the preprocessing module may be disclosed elsewhere in the present disclosure (e.g. in the description of FIG. 5).

The decomposition module 430 may decompose an image into a plurality of components. In some embodiments, the components may include high-frequency components and low-frequency components (or referred to as high-frequency signal components and low-frequency signal components). The decomposition module 430 may perform decomposition by one or more filters. Exemplary filters include a low-pass filter, a high-pass filter, a band-pass filter, a band-stop filter, a comb filter, a notch filter, an all-pass filter, etc. For example, the low-frequency components may be obtained by a low-pass filter after removing or reducing components with frequencies higher than the largest frequency that the low-pass filter allows to pass. The high-frequency components may be obtained by removing or reducing the low-frequency components from the original plurality of components of the image. In some embodiment, the decomposition module 430 may perform a pyramid decomposition on the received image. The pyramid decomposition may include low-pass filtering, downsampling, upsampling, and/or band-pass filtering. In some embodiments, the decomposition module 430 may perform one or more rounds of pyramid decomposition on the received image. The decomposition module 430 may send the obtained high-frequency components and low-frequency components to the processing module 440.

The processing module 440 may process the high-frequency components and the low-frequency components of the received images. Exemplary processing may include filtering, amplifying, fusing, or the like, or a combination thereof. Exemplary techniques of fusing the components of images may include data-level fusion, feature-level fusion, and decision-making-level fusion. Herein, the data-level fusion may include a spatial domain algorithm, a transform domain algorithm, etc. The transform domain algorithm may include a pyramid decomposition fusion algorithm, a wavelet transform algorithm, etc. The feature-level fusion may include infrared image fusion based on heat, visible light image fusion based on brightness, etc. The decision-level fusion may include Bayesian method, Dempster-Shafter (DS) evidential reasoning method, vote method, etc.

In some embodiments, the processing module 440 may fuse a pair of low-frequency components corresponding to the visible light image and the infrared image to generate a fused low-frequency component. As used herein, a pair of low-frequency components may include a low-frequency component of the visible light image and a low-frequency component of the infrared image from a same round (or order) of decomposition, e.g., the last round (or the highest order) of decomposition. The fusion may be performed according to a weight function, e.g., a weighted sum, in which the low-frequency component of the visible light image and the low-frequency component of the infrared image are assigned weighting factors, respectively. The weighting factor of the low-frequency component of the visible light image and the weighting factor of the low-frequency component of the infrared image may be set based on factors including, for example, brightness of the surrounding environment, color contrast of the targeted scene, preference of the user, etc. In some embodiments, the sum of the weighting factor of the low-frequency component of the visible light image and the weighting factor of the low-frequency component of the infrared image is 1.

In some embodiments, the processing module 440 may fuse a pair of high-frequency components generated by the decomposition module 430 at a round of decomposition to generate a fused high-frequency component. As used herein, a pair of high-frequency components may include a high-frequency component of the visible light image and a high-frequency component of the infrared image from a same round (or order) of decomposition. A fused high-frequency component corresponding to the visible light image and the infrared image may be generated according to region energy and region correlation. In some embodiments, the processing module 440 may process the high-frequency components of the visible light image and/or the high-frequency components of the infrared image to reduce noise therein before fusing a pair of high-frequency components. For example, the processing module 440 may perform mapping and/or median filtering on the high-frequency component of the visible light image generated at a round of decomposition. As another example, the processing module 440 may amplify the high-frequency component of the infrared image generated at a round of decomposition. The processing module 440 may send the processed low-frequency components and the processed high-frequency components to the reconstruction module 450.

The reconstruction module 450 may generate a fused image. The fused image may contain information or features of the visible light image and the infrared image. In some embodiments, the reconstruction module 450 may perform one or more rounds of pyramid reconstruction based on the fused low-frequency component and the fused high-frequency components generated by the processing module 440. The reconstruction module 450 may send the fused image to the terminal 130 and/or the storage 140 via the network 150.

It should be noted that the above description of the processing device 120 is merely provided for the purpose of illustration, and not intended to limit the scope of the present disclosure. For persons having ordinary skills in the art, various variations and modifications may be performed in the light of the present disclosure. For example, the preprocessing module 420 may also preprocess the high-frequency components to reduce the noise in the high-frequency components. As another example, the image acquisition module 410 may preprocess the obtained images, and the preprocessing module 420 may be omitted.

Figure 5:
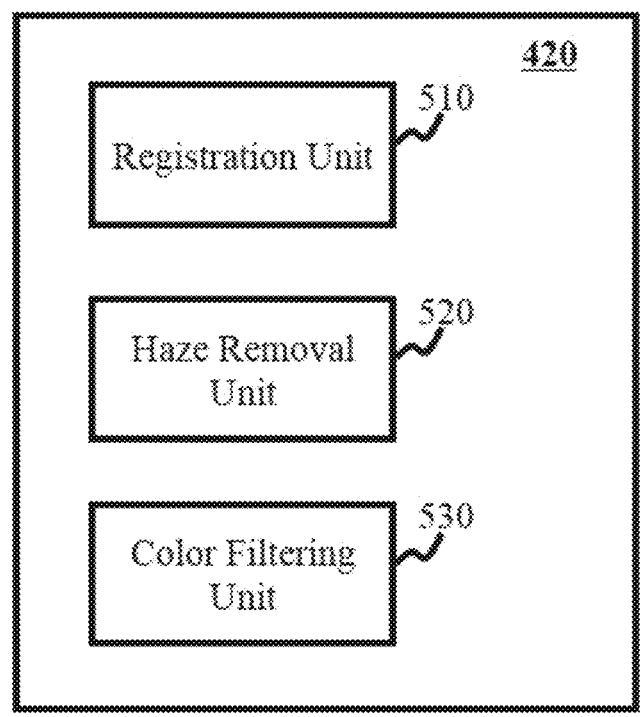
FIG. 5 is a block diagram illustrating an exemplary preprocessing module according to some embodiments of the present disclosure.

FIG. 5 is a block diagram illustrating an exemplary preprocessing module according to some embodiments of the present disclosure. In some embodiments, the preprocessing module 420 may include a registration unit 510, a haze removal unit 520, and a color filtering unit 530. The modules in the preprocessing module 420 may have wired or wireless connections. A module may be local, remote, or a combination of the two. The preprocessing module 420 may be implemented on a computing device as illustrated in FIG. 2 or a mobile device as illustrated in FIG. 3.

The registration unit 510 may register a visible light image and an infrared image into a same coordinate system. The coordinate system may include a Cartesian coordinate system, a polar coordinate system, a cylindrical and spherical coordinate system, a homogeneous coordinate system, etc. In some embodiments, the registration unit 510 may register the visible light image and the infrared image using an image registration algorithm, including an area-based image registration algorithm, a feature-based image registration algorithm, etc. For example, one or more features of the visible light image and the infrared image may be determined and used to register the visible light image and the infrared image linearly and/or non-linearly. In some embodiments, the visible light image may be designated as a reference and the infrared image may be registered with the reference visible light image to obtain a registered infrared image.

The haze removal unit 520 may determine a bright area on the visible light image and optimize a transmittance of pixels on the bright area. The bright area may include a sky, a body of water, or another area with a color close to white. The bright area on the visible light image may be determined based on a luminance threshold technique, a luminance and color-based general detection technique, a multi-featurebased detection technique, etc. In some embodiments, the haze removal unit 520 may determine an initial transmittance of the pixel on the visible light image and improve or optimize the initial transmittance. In some embodiments, the haze removal unit 520 may improve or optimize the transmittance of the pixels within the bright area to obtain a first transmittance. Then the haze removal unit 520 may further improve or optimize the first transmittance of the pixels at the edge of the bright area to obtain a second transmittance. The haze removal unit 520 may eliminate or reduce a color spot on the visible light image. As used herein, a color spot may be an area with lower brightness than the surrounding area.

The color filtering unit 530 may filter noise in the color components of pixels on the visible light image. Exemplary techniques of filtering noise in an image may include mean filtering, median filtering, Gaussian filtering, bilateral filtering, guided filtering, etc. In some embodiments, the color filtering unit 530 may filter noise based on the pixels on the visible light image using a median filtering technique. In some embodiments, the color filtering unit 530 may filter noise based on the pixels on the visible light image and a reference image using a guided filtering technique. The reference image may include an infrared image, an X-ray image, an electron image, an ultrasonic image, a radar image, etc.

It should be noted that the above description of the preprocessing module 420 is merely provided for the purposes of illustration, and not intended to limit the scope of the present disclosure. For persons having ordinary skills in the art, various variations and modifications may be performed in the light of the present disclosure. For example, the registration unit 510 may be omitted.

Figure 6:
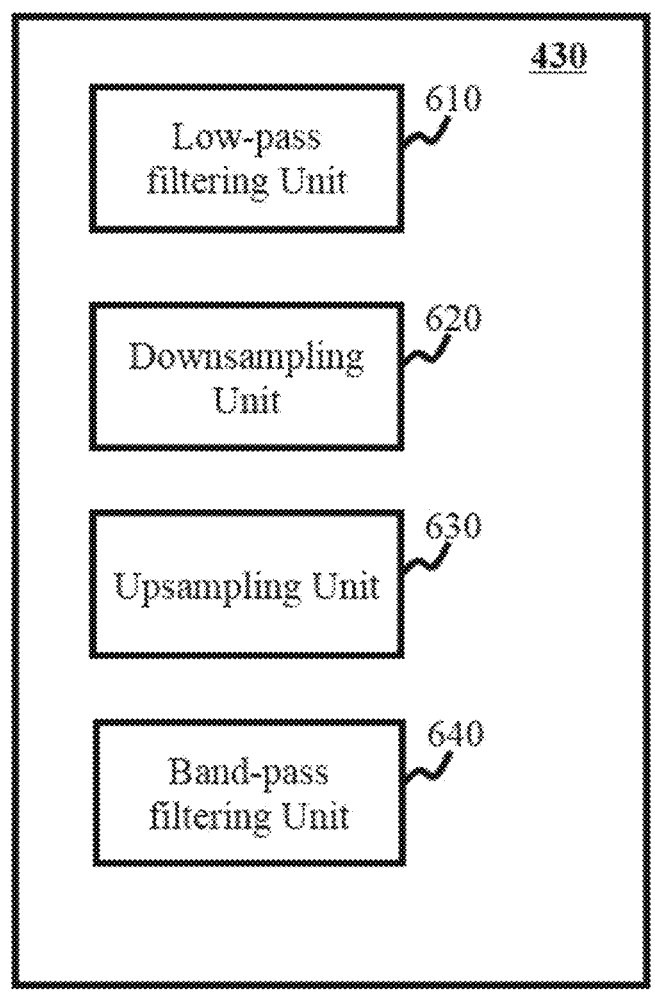
FIG. 6 is a block diagram illustrating an exemplary decomposition module according to some embodiments of the present disclosure.

FIG. 6 is a block diagram illustrating an exemplary decomposition module 430 according to some embodiments of the present disclosure. The decomposition module 430 may perform an image decomposition. The image may be a visible light image, an infrared image, or the like, or any combination thereof. In some embodiments, the image decomposition may be pyramid decomposition. The decomposition module 430 may include a low-pass filtering unit 610, a downsampling unit 620, an upsampling unit 630, and a band-pass filtering unit 640. The decomposition module 430 may be implemented on a computing device as illustrated in FIG. 2 or a mobile device as illustrated in FIG. 3.

The low-pass filtering unit 610 may allow passage of signals of an image (e.g., a visible light image, an infrared image, etc.) whose frequencies are lower than a cutoff frequency and attenuate signals of the image whose frequencies are higher than the cutoff frequency. The cutoff frequency may be a value of frequency determined automatically according to a setting of the image fusion system 100, or manually by a user. In some embodiments, the low-pass filtering unit 610 may reduce signal components of high-frequency with a digital low-pass filter. The high-frequency signal components may be misinterpreted while downsampled. For example, the low-pass filtering unit 610 may filter a visible light image and/or an infrared image to generate a low-pass visible light image and/or a low-pass infrared image. In some embodiments, the low-pass filter unit 610 may perform a Gauss low-pass filtering process. For example, in a pyramid decomposition, a low-pass filtering process may be Gaussian blur, implemented by a convolution operator $$W = \frac{1}{256}\begin{bmatrix} 1 & 4 & 6 & 4 & 1 \\ 4 & 16 & 24 & 16 & 4 \\ 6 & 24 & 36 & 24 & 6 \\ 4 & 16 & 24 & 16 & 4 \\ 1 & 4 & 6 & 4 & 1 \end{bmatrix}, \quad (1\text{-A})$$

and equation:

$$G_i = W * M_{i-1}, \quad (1\text{-B})$$

where $M_{i-1}$ is an original image matrix, and $G_i$ is a low-pass image matrix (also be referred as a low-frequency component). In some embodiments, the low-pass filtering unit 610 may be a low-pass filter. For example, the low-pass filter may be a combination of an operational amplifier and a capacitor.

The downsampling unit 620 may reduce a sampling rate of the low-pass visible light image and/or the low-pass infrared image. For example, the downsampling may reduce the file size of the low-pass visible light image and/or the low-pass infrared image. In some embodiments, the downsampling unit 620 may provide a downsampling factor. The downsampling factor may be an integer greater than one or a rational number greater than one. For downsampling, the original sampling interval may be multiplied by the downsampling factor to provide the actual sampling interval, or equivalently, the original sampling rate may be divided by the downsampling factor to provide the actual sampling rate. For example, in the pyramid decomposition, the downsampling factor may be 2. The downsampling unit 620 may perform an interlaced sampling on the low-pass image matrix $G_i$ to generate a new image matrix $G_i'$. The new image matrix $G_i'$ may be assigned to a next value of In some embodiments, the downsampling unit 620 may be a decimator.

The upsampling unit 630 may increase the sampling rate of the reduced visible light image and/or the reduced infrared image, complementary to the downsampling unit 620. In some embodiments, the upsampling unit 630 may include an upsampling factor. The upsampling factor may be an integer greater than one or a rational number greater than one. For upsampling, the original sampling interval may be divided by the upsampling factor to provide the actual sampling interval, or equivalently, the original sampling rate may be multiplied by the upsampling factor to provide the actual sampling rate, by inserting one or more zeros into every two samples. For example, upsampling a sequence x[n] by an integer upsampling factor L may refer to inserting (L−1) zeros every two samples, to generate an upsampled sequence $x_L[n]$. As another example, in pyramid decomposition, the upsampling unit 630 may insert zeros interlacedly into the downsampled image matrix $G_i'$ to generate a supplementary image matrix $G_i^0$.

The band-pass filtering unit 640 may allow passage of signals of an image (e.g., a visible light image, an infrared image, etc.) whose frequencies are within a range and attenuate signals of the image whose frequencies exceed the range. In some embodiments, the band-pass filtering unit 640 may filter the upsampled visible light image and/or the upsampled infrared image to generate a band-pass visible light image and/or a band-pass infrared image. For example, in the pyramid decomposition, the band-pass filtering process may also be implemented as a convolution operation:

$$G_i' = 4W * G_i^0, \quad (2)$$

where W and $G_i^o$ are designated before the band-pass filtering, and $G_i^t$ is designated as a band-pass image matrix. For instance, a high-frequency component $H_i$ is determined as:

$$H_i = \frac{M_{i-1}}{G_i^t} - 1, \qquad (3)$$

where $M_{i-1}$ is designated as the original image matrix. In some embodiments, the band-pass filtering unit 640 may be a band-pass filter, or a combination of a low-pass filter and a high-pass filter.

It should be noted that the above description of the decomposition module 430 is merely provided for the purposes of illustration, and not intended to limit the scope of the present disclosure. For persons having ordinary skills in the art, multiple variations and modifications may be made under the teachings of the present disclosure. For example, the low-pass filtering unit 610 may be omitted. The band-pass filtering unit 640 may be a combination of a low-pass filter and a high-pass filter that may perform the low-pass filtering process.

Figure 7A:
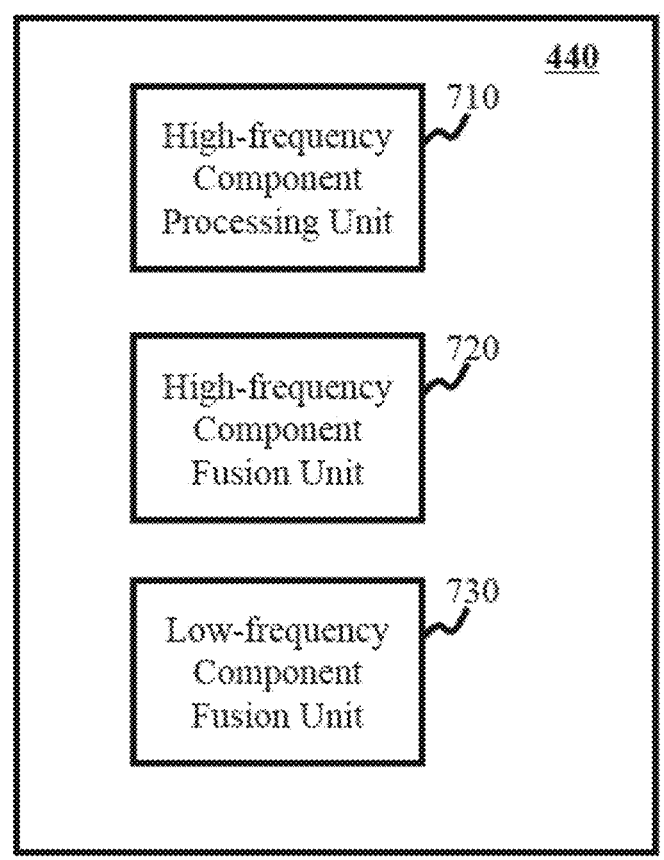
FIG. 7A is a block diagram illustrating an exemplary processing module according to some embodiments of the present disclosure.

FIG. 7A is a block diagram illustrating an exemplary processing module 440 according to some embodiments of the present disclosure. In some embodiments, the processing module 440 may process an image, an image matrix, a string of image data, or the like, or any combination thereof. The image may be a visible light image, an infrared image, or the like, or any combination thereof. In some embodiments, the processing module 440 may process the high-frequency components and/or the low-frequency components generated by the pyramid decomposition. The processing module 440 may include a high-frequency component processing unit 710, a high-frequency component fusion unit 720, and a low-frequency component fusion unit 730. The processing module 440 may be implemented on a computing device as illustrated in FIG. 2 or a mobile device as illustrated in FIG. 3.

The high-frequency component processing unit 710 may process high-frequency components of one or more images. The one or more images may include a visible light image, an infrared image, or the like, or any combination thereof. In some embodiments, the high-frequency component processing unit 710 may process high-frequency components of a visible light image. For instance, the high-frequency component processing unit 710 may process high-frequency components of a visible light image acquired in a low lighting condition. The visible light image may include noises that may interfere with further image processing. The high-frequency component processing unit 710 may remove or reduce the noises. In some embodiments, most of the noises may be included in the high-frequency components of the visible light image generated by the pyramid decomposition as described elsewhere in the present disclosure. An absolute value of the high-frequency components may include noise information other than edge information of the visible light image.

In some embodiments, the high-frequency component processing unit 710 may perform a coefficient mapping to remove or reduce noises. For example, high-frequency thresholds may be set to remove or reduce the noises. The high-frequency thresholds may include a first high-frequency threshold and a second high-frequency threshold. In some embodiments, the first high-frequency threshold and the second high-frequency threshold may depend on the image gain and/or the image noise level. The higher the image gain and the image noise level are, the larger the first high-frequency threshold and the second high-frequency threshold may be. The high-frequency components whose absolute values are less than the first high-frequency threshold may be considered as small noises. The high-frequency components with absolute values that are greater than the second high-frequency threshold may be considered as large noises. The high-frequency components with absolute values that are between the first high-frequency threshold and the second high-frequency threshold may be considered as a mixed noise of small and large noises. For example, the absolute value of the high-frequency components considered as small noises may be less than the absolute value of the object edge in the image. However, the absolute value of the high-frequency components considered as large noises may be similar to the absolute value of the object edge in the image. The coefficient mapping may remove or reduce small noises. In some embodiments, large noises (e.g. impulse noises) may be removed by median filtering, which may preserve edge information of the visible light image.

The high-frequency component processing unit 710 may perform coefficient mapping followed by the median filtering. V_H may be designated as original high-frequency components of a visible light image. V_H' may be designated as processed high-frequency components of the visible light image. $x_1$ and $x_2$ may be designated as a first high-frequency threshold and a second high-frequency threshold, respectively. The first high-frequency threshold and the second high-frequency threshold may be selected depending on, for example, a specific noise level of the visible light image. For example, $x_1$ and $x_2$ may be set as 0.02 and 0.8, respectively, if the noise level is low. As another example, $x_1$ and $x_2$ may be set as 0.1 and 1, respectively, if the noise level is high.

Figure 7B:
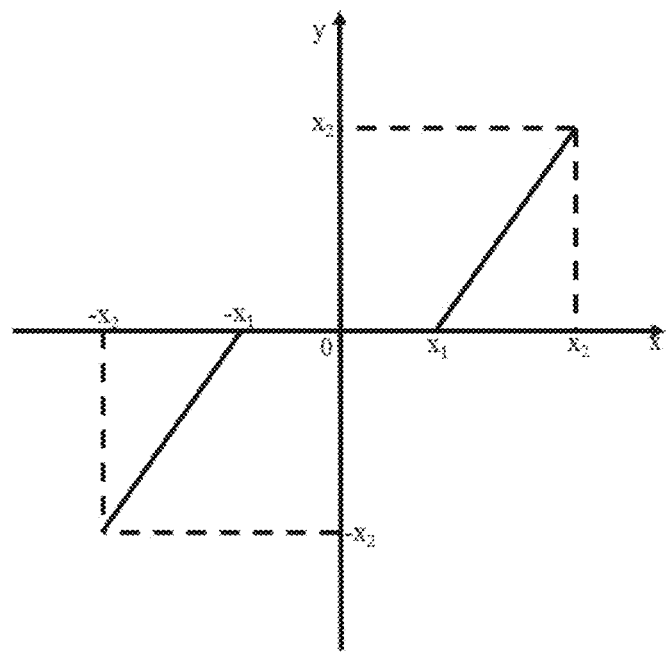
FIG. 7B is a schematic diagram illustrating an exemplary coefficient mapping in the processing of high-frequency components of a visible light image according to some embodiments of the present disclosure.

In some embodiments, as shown in FIG. 7B, the x-axis represents the original high-frequency components V_H, and the y-axis represents the processed high-frequency components V_H'. In response to the determination that the absolute value of V_H is equal to or less than $x_1$, V_H' may be determined as zero. In response to the determination that V_H is equal to or greater than $x_1$ and equal to or less than $x_2$, V_H' may be determined as:

$$V\_H' = \frac{x_2}{x_2 - x_1} \cdot V\_H - \frac{x_1 \cdot x_2}{x_2 - x_1}. \qquad (4)$$

In response to the determination that V_H is equal to or greater than $-x_2$ and not higher than $-x_1$, V_H' may be determined as:

$$V\_H' = \frac{x_2}{x_2 - x_1} \cdot V\_H + \frac{x_1 \cdot x_2}{x_2 - x_1}. \qquad (5)$$

For example, if V_H=x=$x_2$, $$V\_H' = x = \frac{x_2}{x_2 - x_1} \cdot x_2 - \frac{x_1 \cdot x_2}{x_2 - x_1} = x_2.$$

Then a 3×3 window size median filtering may be performed to remove or reduce impulse noises of the visible light image.

In some embodiments, the high-frequency component processing unit 710 may process high-frequency components of an infrared image. The high-frequency component processing unit 710 may amplify the high-frequency components of the infrared image to promote the contribution of the high-frequency components of the infrared image to a fused image. In some embodiments, N_H may be designated as original high-frequency components of an infrared image. N_H' may be designated as processed high-frequency components of the infrared image. b may be designated as an amplification coefficient. A round of ordered pyramid decomposition of the infrared image may generate a high-frequency component of the infrared image. By way of multiple rounds of ordered pyramid decomposition, the high-frequency components may be designated as $N\_H_1$, $N\_H_2$ . . . and $N\_H_n$, in which n represents the number of rounds of ordered pyramid decomposition. Correspondingly, the processed high-frequency components may be designated as $N\_H_1'$, $N\_H_2'$ . . . and $N\_H_n'$. In some embodiments, each high-frequency component may be multiplied by a different amplification coefficient (e.g. $b_1$, $b_2$ . . . and $b_n$, respectively). Correspondingly, $N\_H_1'$ may be determined as $N\_H_1 \cdot b_1$, $N\_H_2'$ may be determined as $N\_H_2 \cdot b_2$ . . . and $N\_H_n'$ may be determined as $N\_H_n \cdot b_n$. The amplification coefficient associated with a high-frequency component from a higher order decomposition may be assigned a lower value compared to a high-frequency component from a lower order decomposition such that the high-frequency components from higher orders decomposition contribute less to, for example, a fused image.

Figure 7C:
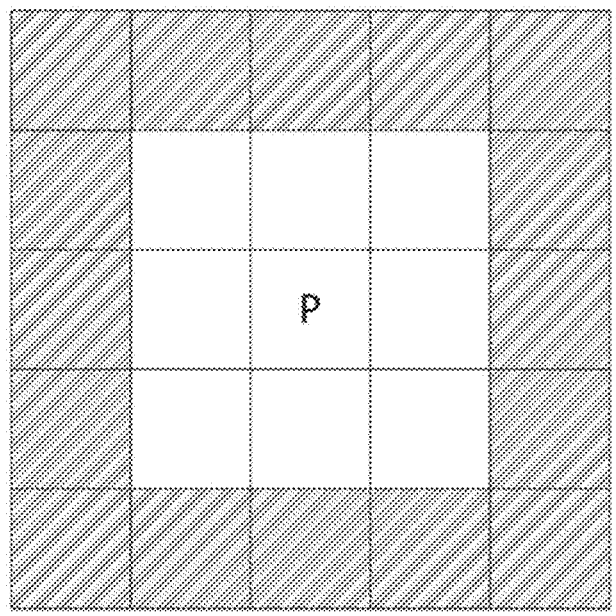
FIG. 7C is a schematic diagram illustrating an exemplary process for determining region energy and region correlation according to some embodiments of the present disclosure.

The high-frequency component fusion unit 720 may fuse high-frequency components of images of a same type or different types. The images may be a visible light image, an infrared image, or the like, or any combination thereof. In some embodiments, the high-frequency component fusion unit 720 may fuse high-frequency components of a visible light image and an infrared image. The high-frequency component fusion unit 720 may take region energy and region correlation as references. Then the high-frequency component fusion unit 720 may select useful high-frequency information by characteristic similarity between the visible light image and the infrared image, and generate a high-frequency fusion weight image. For example, the characteristic similarity of a certain region between the visible light image and the infrared image may depend on the region correlation of the visible light image and the infrared image. For instance, the certain region may be a square area centered at a certain pixel. In some embodiments, the region energy of the visible light image may be designated as $D_1$. The region energy of the infrared image may be designated as $D_2$. The region correlation of the visible light image and the infrared image may be designated as DD. In some embodiments, the region energy and the region correlation may be determined as follows:

$$D_1(i,j) = \Sigma_{0 \leq n \leq R}[V\_H(i+n, j+n)]^2, \quad (6)$$

$$D_2(i,j) = \Sigma_{0 \leq n \leq R}[N\_H(i+n, j+n)]^2, \quad (7)$$

$$DD(i,j) = \Sigma_{0 \leq n \leq R}[V\_H(i+n, j+n) \cdot N\_H(i+n, j+n)]^2, \quad (8)$$

where i is equal to or greater than zero and equal to or less than M (the length of the high-frequency component matrix), j is equal to or greater than zero and equal to or less than N (the width of the high-frequency component matrix), (i, j) is the coordinate position of high-frequency component information, and R is designated as the radius of a region window. In some embodiments, considering limitations of hardware performance, after a round of pyramid decomposition, the length and the width of $V\_H_n$ (a decomposed high-frequency component matrix of a visible light image) or $N\_H_n$ (a decomposed high-frequency component matrix of an infrared light image) may be reduced to half of $V\_L_{n-1}$ (an original low-frequency component matrix of a visible light image) or $N\_L_{n-1}$ (an original low-frequency component matrix of an infrared image), respectively. As a result, the length and the width of $V\_H_n$ or $N\_H_n$ in a round of pyramid decomposition may different from those of other rounds of pyramid decompositions. In some embodiments, the region window may be a sliding window used to calculate the values of $D_1$, $D_2$ and DD, also may be referred as the range of calculation. The radius of the region window R may be the size of the range. For example, FIG. 7C shows the range of calculation at the point P. When R equals 1, the range of calculation may be the area including the open boxes. When R equals 2, the range of calculation may be the area including the open boxes plus the area including the hatched boxes.

The fused high-frequency component matrix may be designated as F_H. In some embodiments, F_H may be determined as follow:

$$F\_H = \begin{cases} 1, & DD < \theta \text{ and } D_1 > D_2 \\ 0, & DD \leq \theta \text{ and } D_1 \leq D_2 \\ \frac{1}{2} + \frac{1}{2}\left(\frac{1-DD}{1-\theta}\right), & DD > \theta \text{ and } D_1 > D_2 \\ \frac{1}{2} - \frac{1}{2}\left(\frac{1-DD}{1-\theta}\right), & DD > \theta \text{ and } D_1 \leq D_2 \end{cases} \quad (9)$$

where θ is determined as the ratio of the region correlation to the region energy. The value of θ may range from 0 to 1. The higher θ is, the greater the region correlation is. For example, in response to a determination that the noise level of the visible light image and the noise level of the infrared image is close, θ may be determined as a value less than 0.5; otherwise, θ may be determined as a value greater than 0.5. When DD is greater than θ, the character of the visible light image and the infrared image may be considered similar. In some embodiments, the fused high-frequency component matrix may be determined by a maximum screening algorithm as follows:

$$F\_H(i, j) = \begin{cases} V\_H(i, j), & V\_H(i, j) \geq N\_H(i, j) \\ N\_H(i, j), & V\_H(i, j) < N\_H(i, j) \end{cases}. \quad (10)$$

In some embodiments, the fused high-frequency component matrix may be determined by a maximum absolute value screening algorithm as follows:

$$F\_H(i, j) = \begin{cases} V\_H(i, j), & |V\_H(i, j)| \geq |N\_H(i, j)| \\ N\_H(i, j), & |V\_H(i, j)| < |N\_H(i, j)| \end{cases}. \quad (11)$$

The low-frequency component fusion unit 730 may fuse low-frequency components of images of a same type or different types. In some embodiments, the images may be a visible light image, an infrared image, or the like, or any combination thereof. The low-frequency component fusion unit 730 may fuse a low-frequency component of the visible light image and a low-frequency component of the infrared image. The contribution of a visible light low-frequency component and the contribution of an infrared low-frequency component to a fused image may be designated as $I_a$ and $I_b$, respectively. The sum of $I_a$ and $I_b$ may be 1. The greater the $I_a$ is, the closer the luminance of the fused image is to the luminance of the visible light image. On the contrary, the greater $I_b$ is, the closer the luminance of the fused image is to the luminance of the infrared image. In some embodiments, the low-frequency component fusion unit 730 may estimate the luminance of the fused image. The $I_a$ may be set automatically based on the estimation by, for example, the processing device 120.

In some embodiments, a round of ordered pyramid decomposition of the visible light image may generate a low-frequency component of the visible light image and a low-frequency component of the infrared image. By way of multiple rounds of ordered pyramid decomposition, the low-frequency components of the visible light image may be designated as $V\_L_1, V\_L_2 \ldots$ and $V\_L_n$, in which n represents the number of rounds of ordered pyramid decomposition. By way of multiple rounds of ordered pyramid decomposition, the low-frequency components of the infrared image may be designated as $N\_L_1, N\_L_2 \ldots$ and $N\_L_n$. The fused low-frequency component may depend on the last round of the ordered pyramid decomposition, determined as, for example:

$$F\_L = I_a \cdot V\_L_n + I_b \cdot N\_L_n. \quad (12)$$

In some embodiments, the luminance information of the infrared image may be abnormal because of different reflection parameters of different materials with respect to infrared light captured in an image. For example, a license plate of a vehicle or a red object (e.g., a red car, a red roof or door of a building, a person wearing a red clothes, etc.) may reflect more infrared light leading to overexposure in the infrared image. Thus, a low-frequency fusion threshold K may be employed to estimate whether the luminance information of the infrared image is abnormal. Merely by way of example, K ranges from 90 to 120 depending on the intensity of the infrared light. If a value of $(V\_L_n - N\_L_n)$ is greater than K, the infrared image may be considered abnormal. Otherwise, the infrared image may be considered normal. For instance, a low-frequency fusion weight coefficient may be set as L_W according to a broken line smoothing equation as follow:

$$L\_W = \begin{cases} 1, & V\_L_n - N\_L_n > K \\ \frac{1-I_a}{K-50} \cdot (V\_L_n - N\_L_n) + \frac{I_a \cdot K - 50}{K-50}, & V\_L_n - N\_L_n \leq K \end{cases}, \quad (13)$$

$$K \in [90, 120].$$

In some embodiments, the fused low-frequency component may be determined as:

$$F\_L = L\_W \cdot V\_L_n + (1 - L\_W) \cdot N\_L_n. \quad (14)$$

In some embodiments, the fused low-frequency component may be determined as an average as follows:

$$F\_L = 0.5 \cdot V\_L_n + 0.5 \cdot N\_L_n. \quad (15)$$

In some embodiments, the fused low-frequency component may be determined as a weighted sum as follows:

$$F\_L = I_a \cdot V\_L_n + (1 \cdot I_a) \cdot N\_L_n, I_a \in [0,1]. \quad (16)$$

Figure 8:
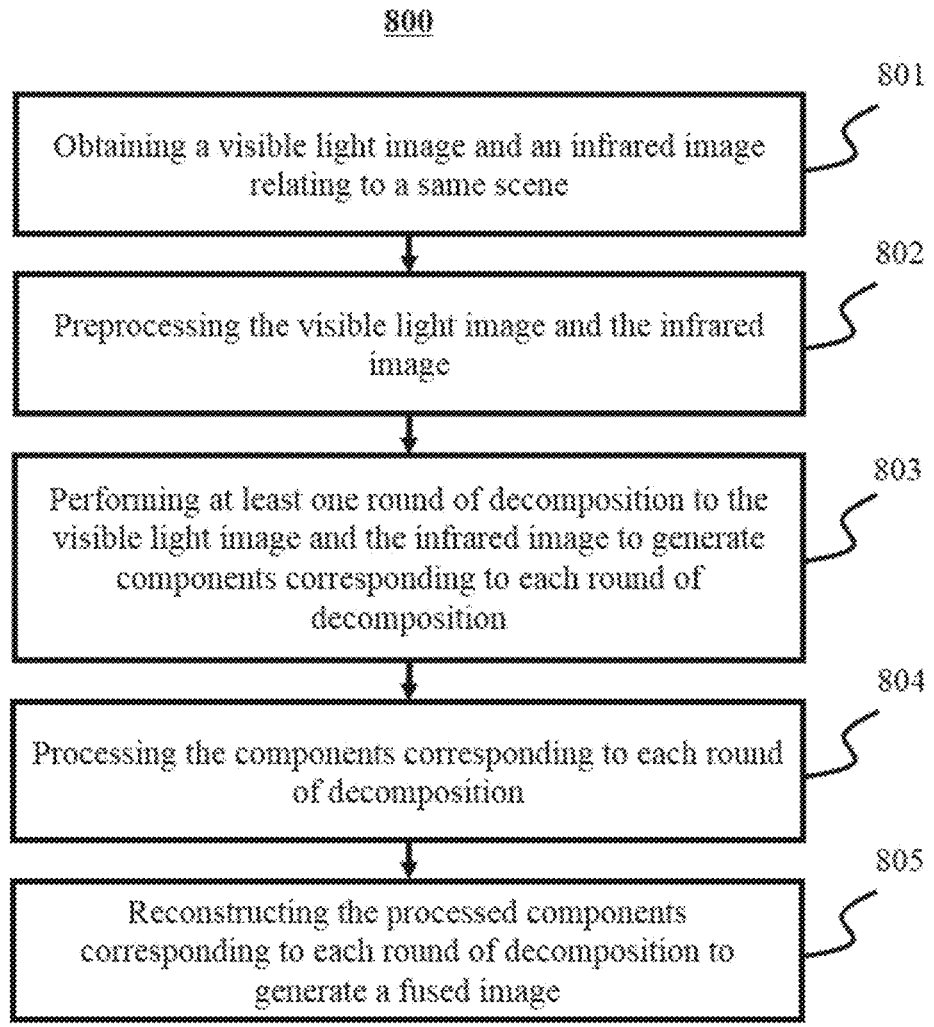
FIG. 8 is a flowchart illustrating an exemplary process for generating a fused image according to some embodiments of the present disclosure.

FIG. 8 is a flowchart illustrating an exemplary process for generating a fused image according to some embodiments of the present disclosure. The process may include image acquisition, image preprocessing, image decomposition, image processing, and image reconstruction. The process for generating a fused image may be performed by a computing device as illustrated in FIG. 2 or a mobile device as illustrated in FIG. 3.

In 801, a visible light image and an infrared image may be obtained. The visible light image and the infrared image may relate to a same scene. As used herein, two images relating a same scene may refer to that each of the two images includes a portion representing a same or essentially a same specific area. The visible light image may be acquired by a visible light camera that may detect visible light. The infrared image may be acquired by an infrared camera that may detect infrared light. The two types of cameras may detect a same scene from a same angle. As used herein, two cameras detecting a same scene may refer to that the cameras may acquire images relating to a same scene. As used herein, a same angle may describe the situation in which the angles from which the cameras detect a scene are the same or essentially the same. For instance, the difference between the angles from which the cameras detect a scene are less than 20°, or 15°, or 10°, or 8°, or 5°, etc. The images obtained from the two types of cameras may reflect, respectively, features of the same specific area from different aspects. The features may include brightness, color, color contrast, etc. For example, the visible light image may reflect the color information of the specific scene, and the infrared image may reflect the brightness information of the same specific scene.

In some embodiments, operation 801 may be performed by the image acquisition module 410. In some embodiments, the visible light image and the infrared image may be obtained from the terminal 130 and/or the storage 140 via the network 150. For example, the visible light camera and the infrared camera may take or acquire images of a same scene and upload the images to a storage device via the Internet. Afterwards, the images may be downloaded or retrieved from the storage device via the Internet. In some embodiments, the acquired visible light image and the infrared image may be preprocessed in 801.

In 802, the acquired visible light image and the infrared image may be preprocessed. Operation 802 may be performed by the preprocessing module 420. The preprocessing may include reducing noise, adjusting a bright area, etc. In some embodiments, haze removal and/or color filtering may be performed on the visible light image. Exemplary haze removal techniques may include Optical Haze Removal, Algorithm Haze Removal, Photoelectric Haze Removal, Pseudo Haze Removal, etc. One or more bright areas in the visible light image may be identified and a preprocessed transmittance of the bright areas may be generated through haze removal. As used herein, transmittance of the bright areas may refer to one or more transmittance matrixes. Values in a matrix may correspond to the transmittance of a pixel in a corresponding bright area. Exemplary color filtering techniques may include mean filtering, median filtering, Gaussian filtering, bilateral filtering, guided filtering, etc. Filtered images without noise or with reduced noise may be generated through color filtering. In some embodiments, image registration may be performed with respect to the visible light image and the infrared image. Exemplary image registration techniques may include feature-based registration, transformation-based registration, spatial domain registration, frequency domain registration, multi-modality registration, subject-based registration, similarity-based registration, etc. The image registration may transform the visible light image and the infrared image into a same coordinate.

In 803, the visible light image and the infrared image may be decomposed. Operation 803 may be performed by the decomposition module 430. The visible light image and the infrared image may be decomposed to obtain a plurality of components. The plurality of components may include high-frequency components and low-frequency components. In some embodiments, more than one round of decomposition may be performed. For example, a low-frequency component generated at a round of decomposition may be further decomposed into a high-frequency component and a low-frequency component. The decomposition may be performed by one or more filters including, for example, a low-pass filter, a high-pass filter, a bandpass filter, a band-stop filter, a comb filter, a notch filter, an all-pass filter, etc. In some embodiments, the decomposition may be a pyramid decomposition based on, for example, low-pass filtering, downsampling, upsampling, band-pass filtering, etc.

In 804, the components corresponding to a round of decomposition may be processed. Operation 804 may be performed by the processing module 440. The processing may include fusing components of the images, reducing noise, etc. In some embodiments, a low-frequency component of the visible light image and a low-frequency component of the infrared image may be fused based on, for example, weighting factors applied to the low-frequency component thereof. The weighting factor of the visible light image and/or the weighting factor of the infrared image may vary according to a desired quality of the fused image including, for example, luminance, a material of an object to be imaged, a color of an object to be imaged, or the like, or a combination thereof. In some embodiments, a high-frequency component of the visible light image and a high-frequency component of the infrared image may be fused according to region energy and region correlation of the visible light image and the infrared image. In some embodiments, the high-frequency components of the visible light image and/or the high-frequency components of the infrared image may be preprocessed before being fused in order to reduce noise of the high-frequency components. More descriptions about the processing may be found elsewhere in the present disclosure. See, for example, FIG. 13 and the description thereof.

In 805, the processed components corresponding to multiple rounds of decomposition may be reconstructed to generate a fused image. Operation 805 may be performed by the reconstruction module 450. The fused image may be reconstructed based on an image reconstruction algorithm. Exemplary image reconstruction algorithm may include parallel-beam projection reconstruction, filtered back projection (FBP) reconstruction, iterative image reconstruction, etc. Exemplary parallel-beam projection reconstruction may include the direct Fourier transform reconstruction algorithm, the Radon inversion algorithm, etc. Exemplary filtered back projection reconstruction may include the Hilber transform reconstruction algorithm, the fan-beam filtered back-projection reconstruction algorithm, etc. In some embodiments, one or more rounds of pyramid reconstruction may be performed on the fused high-frequency components and the fused low-frequency components corresponding to one or more rounds of decomposition to obtain a fused image. More descriptions about pyramid reconstruction may be found elsewhere in the present disclosure. See, for example, FIG. 15 and the description thereof.

It should be noted that the above description of fusing images is merely provided for the purposes of illustration, and not intended to limit the scope of the present disclosure. For persons having ordinary skills in the art, various variations and modifications may be performed in the light of the present disclosure. For example, operations 803 and 804 may be processed simultaneously. As another example, operation 802 may be combined with 801.

Figure 9:
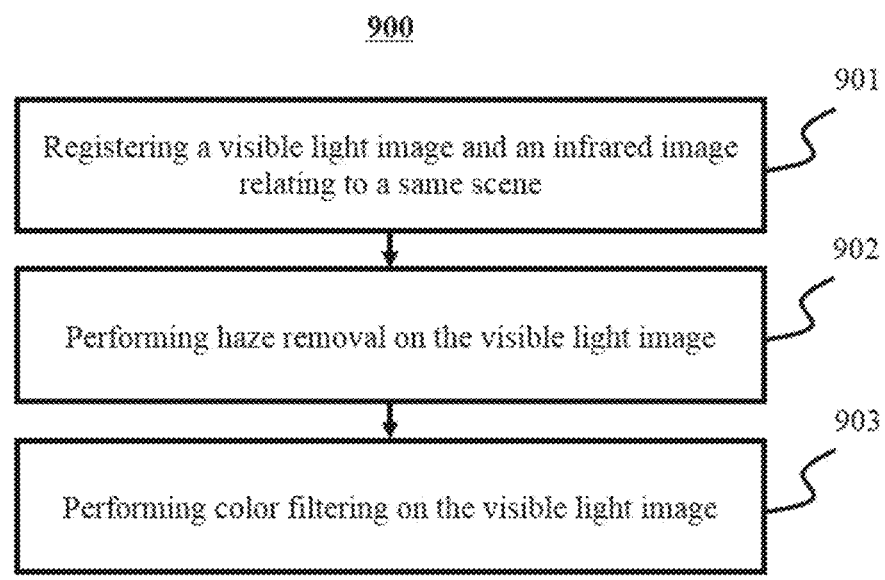
FIG. 9 is a flowchart illustrating an exemplary process for preprocessing the visible light image and the infrared image according to some embodiments of the present disclosure.

FIG. 9 is a flowchart illustrating an exemplary process for preprocessing a visible light image and an infrared image according to some embodiments of the present disclosure. The preprocessing may include image registration, haze removal, color filtering, etc. The process may be performed by computing device as illustrated in FIG. 2 or a mobile device as illustrated in FIG. 3.

In 901, the visible light image and infrared image may be registered. Operation 901 may be performed by the registration unit 510. The registration may include grey-based registration, transform domain registration, feature-based registration, etc. The registration may be performed based on one or more algorithms such as a decision tree algorithm, a Bayesian algorithm, an Artificial Neural Network (ANN) algorithm, a Nearest Neighbor Search (NNS) algorithm, a Support Vector Machine (SVM) algorithm, an association rule-based algorithm, a machine learning algorithm, etc.

In some embodiments, the registration may be performed based on features of the images. For example, the Speeded Up Robust Features (SURF) of the visible light image and the infrared image may be extracted and converted into SURF descriptors. Herein, the SURF may be determined based on the gradient information on the visible light image and the infrared image. The gradient information may include density gradient information, grey gradient information, color gradient information, etc. The SURF descriptors may be binary numbers and represent a distribution of the intensity information within a neighborhood of a point of interest in the visible light image and in the infrared image. After the SURF descriptors of the visible light image and the infrared image are determined, the SURF descriptors of the visible light image may be registered with the SURF descriptors of the infrared image using, for example, a Nearest Neighbor Search algorithm. Exemplary Nearest Neighbor Search algorithms may include a k-Nearest Neighbor (kNN) Search algorithm, an Approximate Nearest Neighbor Search algorithm, a Nearest Neighbor Distance Ratio Search algorithm, a Fixed-radius Near Neighbor Search algorithm, an All Nearest Neighbor Search algorithm, etc. Then the SURF descriptors registered by error may be identified and deleted, and the other registered SURF descriptors may be optimized. Based on the optimal SURF descriptors, parameters of a transformation matrix TFORM may be determined for the image registration. Exemplary techniques to determine the parameters of the transformation matrix may include a Parameter Estimation technique, a Maximum Likelihood technique, a Least Square technique, a Method of Moments, etc. In some embodiments, the infrared image may be registered with the visible light image. For example, a transformation coordinate matrix for the infrared image may be obtained by multiplying the coordinate matrix of the infrared image by an inverse matrix of the transformation matrix TFORM. Then an infrared image registered with the visible light image may be obtained based on the transformation coordinate matrix for the infrared image.

In 902, haze removal may be performed on the visible light image. Exemplary haze removal techniques may include Optical Haze Removal, Algorithm Haze Removal, Photoelectric Haze Removal, Pseudo Haze Removal, etc. Operation 902 may be performed by the haze removal unit 520. In some embodiments, the haze removal may include determining a bright area in the visible light image and optimizing the transmittance of pixels included in the bright area. The visible light image may include multiple bright areas. A bright area in the visible light image may be identified based on, for example, a luminance threshold algorithm, a luminance and color-based general detection algorithm, a multi-feature-based detection algorithm, etc. For example, a bright area in the visible light image may be determined based on a dark channel matrix and ambient light. The dark channel matrix may be determined based on characteristics of pixels in the visible light image. Herein, the characteristic of a pixel may include the luminance components of the pixel, the color components of the pixel, the grayscale components of the pixel, etc. The ambient light may be determined based on the dark channel matrix.

Figure 10A:
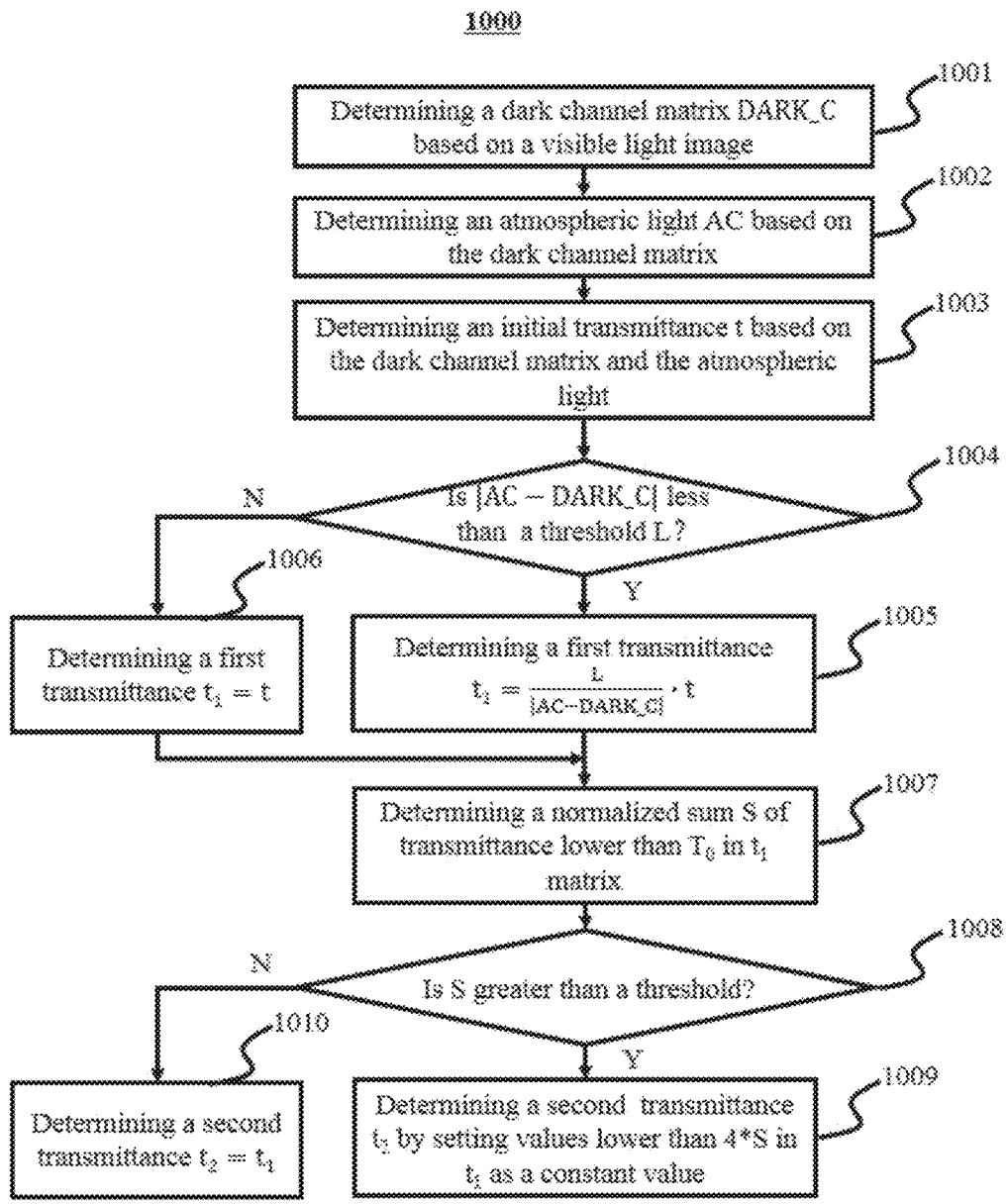
FIG. 10A is a flowchart illustrating an exemplary process for haze removal on a visible light image according to some embodiments of the present disclosure.

In some embodiments, the transmittance of pixels in an identified bright area may be optimized according to the description in the FIG. 10A. In some embodiments, the transmittance of pixels in an identified bright areas may include optimizing the transmittance of pixels within the bright areas and/or on the edge of the bright areas.

In 903, color filtering may be performed on the visible light image. Operation 903 may be performed by the color filtering unit 530. In some embodiments, the color filtering may be performed based on the pixels in the visible light image and the pixels in the infrared image based on a guided filtering algorithm. For example, the color components of the visible light image and the luminance components of the infrared image may both be downsampled at first. Then a guided filtering may be performed on the components of the downsampled visible light image and the components of the downsampled infrared image. As used herein, the components may include the luminance component of a pixel, the color component of a pixel, the grayscale component of a pixel, etc. Based on the filtered components of the visible light image and the filtered components of the infrared image, the color components of the visible light image may be upsampled to obtain denoised color components of the visible light image.

It should be noted that the above description of the process 900 is merely provided for the purposes of illustration, and not intended to limit the scope of the present disclosure. For persons having ordinary skills in the art, various variations and modifications may be performed in the light of the present disclosure. For example, operation 902 may be performed before 901 or simultaneously with 901. As another example, operation 901 may be omitted. As another example, operation 903 may be omitted if the visible light image is not captured under low luminance.

FIG. 10A is a flowchart illustrating an exemplary process for haze removal on a visible light image according to some embodiments of the present disclosure. The haze removal process may include determining bright areas, determining an initial transmittance, determining a first transmittance, determining a second transmittance, etc. The process may be performed by the haze removal unit 520, which in turn may be implemented on a computing device as illustrated in FIG. 2 or a mobile device as illustrated in FIG. 3.

In 1001, a dark channel matrix may be determined based on a visible light image. The dark channel matrix may be designated as DARK_C. The visible light image may include a plurality of pixels. The plurality of pixels may represent the color of an area in the visible light image. The color may include red, green, or blue, or a combination thereof. A type of color may be represented by a matrix that contains the color value of a pixel in the visible light image. For example, the pixels in the visible light image may include a red (R) matrix, a green (G) matrix, and a blue (B) matrix. In some embodiments, the dark channel matrix may be determined based on the R matrix, the G matrix, and the B matrix according to an equation:

$$\text{DARK\_C} = \min_{c \in w_h}(\min_{c \in (R,G,B)}(I^c)), \tag{17}$$

where $I^c$ may be the values in the R matrix, the G matrix, and the B matrix corresponding to pixels (or referred to as pixel values).

A pixel value may be also referred to as a value in the following description. A first minimum value corresponding to a pixel may be determined by comparing the values in the R matrix, the G matrix, and the B matrix with respect to the same pixel. Exemplary algorithms to determine a minimum value by comparison may include a bubbling algorithm, a selection algorithm, an insertion algorithm, or the like, or a combination thereof. A minimum channel matrix may be determined based on the determined first minimum values with respect to the pixels in the visible light image. In some embodiments, the minimum channel matrix may be designated as the dark channel matrix.

In some embodiments, the minimum channel matrix may be further processed to determine the dark channel matrix. For example, a sliding window may be determined on the minimum channel matrix DARK_C. The sliding window may be a window that may move across the minimum channel matrix. The sliding window may be a two dimensional sliding window, such as, for example, a 1*1 sliding window, 3*3 sliding window, etc. A second minimum value within the sliding window may be determined as the new value of the central pixel of the sliding window. The process may be iterated until the sliding window traverses the whole minimum channel matrix. Herein, each value in the minimum channel matrix may be traversed by the sliding window one or more times.

In 1002, an ambient light may be determined based on the dark channel matrix determined in 1001. The ambient light may be designated as AC. In some embodiments, a first maximum value in the dark channel matrix and the corresponding set of coordinates may be determined. A set of coordinates may include, for example, an X coordinate, a Y coordinate, and a Z coordinate of the pixel in an X-Y-Z coordinate system. The first maximum value may correspond to a pixel in the image. And the corresponding set of coordinates may be the coordinates of the pixel in the coordinate system. As used herein, the coordinate system may include a Cartesian coordinate system, a polar coordinate system, a cylindrical and spherical coordinate system, a homogeneous coordinate system, etc. The dark channel matrix may include one or more sets of coordinates corresponding to the first maximum value. Based on the determined set(s) of coordinates of the first maximum value in the dark channel matrix, values in the R matrix, the G matrix, and the B matrix corresponding to the coordinates of the first maximum value may be determined, respectively. The determined values of the R matrix, the G matrix, and the B matrix may correspond to the color value of the pixel.

In some embodiments, a second maximum value among the values in the G matrix corresponding to the set(s) of coordinates of the first maximum value may be determined.

Exemplary methods to determine the second maximum may include a bubble sort method, a selection method, an interpolation method, etc. The coordinates of the second maximum value may be determined as a reference. Based on the set of coordinates of the second maximum value in the G matrix, three corresponding values in the R matrix, the G matrix, and the B matrix may be determined, respectively. A third minimum value among the three values in the R matrix, the G matrix, and the B matrix may be determined as the ambient light AC.

Figure 10B:
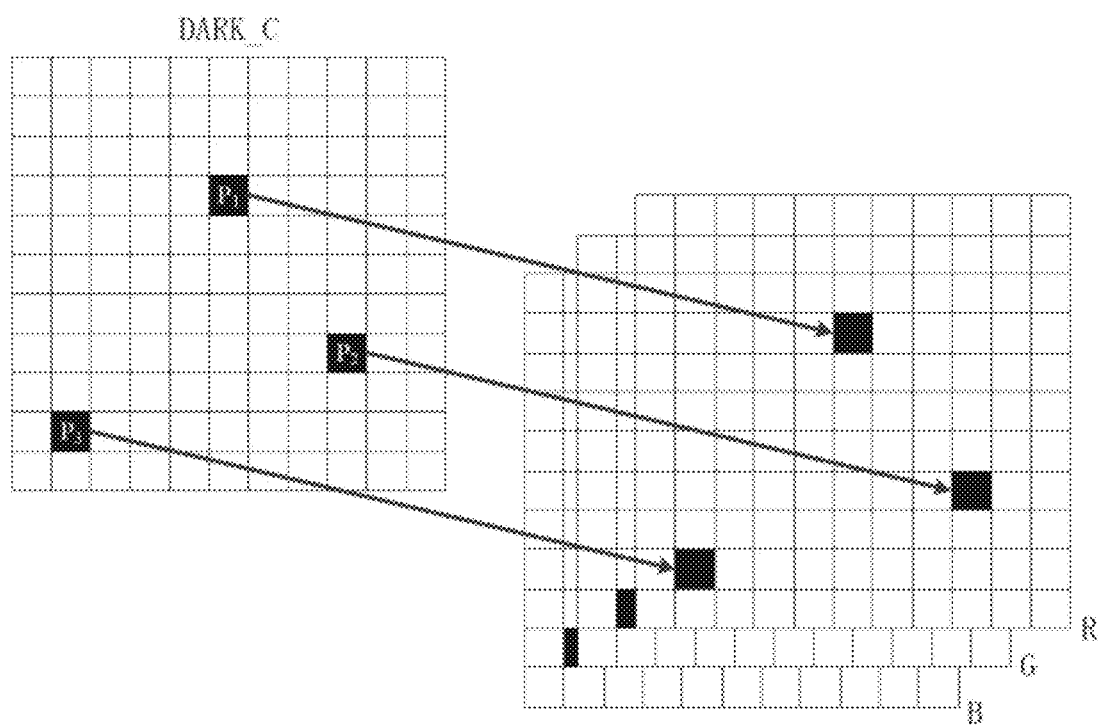
FIG. 10B illustrates an example of determining a dark channel matrix according to some embodiments of the present disclosure.

For example, a set of three coordinates may be designated as $P_1$, $P_2$, and $P_3$, respectively, for a first maximum value in the dark channel matrix as shown in FIG. 10B. Taking $P_1$ as an example, it may have a corresponding value in each of the R matrix, the G matrix, and the B matrix. The values may be designated as $P_{1R}$, $P_{1G}$, and $P_{1B}$. Similarly, the corresponding values of $P_2$ and $P_3$ in the R matrix, the G matrix, and the B matrix may be designated as $P_{2R}$, $P_{2G}$, and $P_{2B}$, and $P_{3R}$, $P_{3G}$, and $P_{3B}$, respectively. The maximum value among $P_{1G}$, $P_{2G}$, and $P_{3G}$ may be determined as a second maximum. As an example, the values of $P_{1G}$, $P_{2G}$, and $P_{3G}$ may be 0, 255, and 100, respectively. $P_{2G}$ is the second maximum and the corresponding coordinate values may be considered as a reference. Then the values of $P_{2R}$, $P_{2G}$, and $P_{2B}$ may be compared with each other and the minimum value of which may be determined as the ambient light AC. For instance, the values of $P_{2R}$, $P_{2G}$, and $P_{2B}$ may be 50, 255, and 150, respectively. Thus, the ambient light AC may be determined as the value of $P_{2R}$ at 50.

In 1003, an initial transmittance may be determined based on the dark channel matrix and the ambient light. The initial transmittance may be designated as t. In some embodiments, the initial transmittance may be determined according to an equation:

$$t = 1 - \frac{DARK\_C}{AC} thr, \quad (18)$$

where DARK_C is the dark channel matrix obtained in 1001, AC is the ambient light obtained in 1002, and thr is the adjustment threshold of haze removal. In some embodiments, the value of thr may range between 0 and 1. The haze removal may be more effective with a higher value of thr. The initial transmittance t may be in the form of a matrix. The values in the matrix may correspond to the plurality of pixels in the visible light image.

In 1004, whether a pixel in the visible light image belongs to a bright area may be determined. In some embodiments, the determination may be performed based on an equation:

$$\text{bright area} = \max\left(\frac{L}{|AC - DARK\_C|}, 1\right), \quad (19)$$

where the threshold L ranges between 70 and 100 according to the statistical data such as illumination gain and/or illumination histogram of an image, etc. With an increase of the illumination gain and/or the illumination histogram, the threshold L may increase. The determination may be performed based on the difference between the ambient light AC and the dark channel matrix DARK_C. For example, the difference may be determined by subtracting the value of each pixel in the dark channel matrix by the value of each corresponding pixel in the matrix of the ambient light. In response to a determination that the difference value is less than the threshold L, the pixel may be determined to belong to a bright area. In response to a determination that the difference value is greater than the threshold L, the pixel may be determined not to belong to a bright area.

In 1005 and 1006, a first transmittance $t_1$ may be determined based on an equation, for example:

$$t1 = \text{bright\_area} * t \quad (20)$$

In response to a determination that the pixel belongs to a bright area, operation 1005 may be performed and the first transmittance $t_1$ may be determined as, for example, $$\frac{L}{|AC - DARK\_C|} t.$$

In this circumstance, the transmittance of the bright area may be increased and the effect of haze removal may be weakened. The increased transmittance of the bright area may eliminate or reduce color spots within the bright area. In response to a determination that the pixel does not belong to a bright area, operation 1006 may be performed and the first transmittance $t_1$ may be determined as the initial transmittance t.

In some embodiments, the determined bright area and the first transmittance may be further optimized. The edge of the bright area may be determined based on the first transmittance. The first transmittance of the determined edge of the bright area may be optimized to generate a second transmittance $t_2$. In 1007, the number of values in the first transmittance $t_1$ that are less than a transmittance threshold $T_0$ may be determined and further normalized. The transmittance threshold $T_0$ may be selected from a transmittance range between 0.3 and 0.7, such as 0.4, 0.5, 0.6, etc. The number of values that are less than the transmittance threshold $T_0$ may be designated as S_SUM. In some embodiments, S_SUM is normalized according to an equation:

$$S = \frac{S\_SUM}{H \times W}, \quad (21)$$

where S may represent the normalized sum, and H×W is the size of the visible light image. H is the number of rows of the visible light image, and W is the number of columns of the visible light image.

In 1008, the normalized sum S may be compared with a sum threshold T. The second transmittance $t_2$ may be determined based on the comparison. Herein, the sum threshold T may vary according to the brightness of the visible light image. For example, the sum threshold T may be set as 0.1 with respect to a visible light acquired in daylight and 0.2 with respect to a visible light acquired at night. In response to a determination that the normalized sum S is greater than the sum threshold T, operation 1009 may be performed. Values in the first transmittance $t_1$ that are less than 4×S may be considered to be located on an edge of the bright area and assigned a constant value such as, for example, 1, 0.9, 0.8, etc. For example, the normalized sum S is equal to 0.15 and the sum threshold T is 0.1. Then the transmittance with a value lower than 0.6 in the first transmittance $t_1$ may be determined as the transmittance of the edge of the bright area. The transmittance of the edge of the bright area may be assigned 1. In this circumstance, the second transmittance $t_2$ may be generated and the color of the edge of the bright area may become the same as the color of the area surrounding the bright area. This may eliminate or reduce the color spots located on the edge of the bright area. In response to a determination that the normalized sum S is less than the threshold T, operation 1010 may be performed and the second transmittance $t_2$ may be determined to be equal to the first transmittance $t_1$.

It should be noted that the above description of the process 1000 is merely provided for the purposes of illustration, and not intended to limit the scope of the present disclosure. For persons having ordinary skills in the art, various variations and modifications may be performed in the light of the present disclosure. For example, the coordinate of the maximum value in the R matrix instead of the G matrix may be considered as the reference to determine the ambient light in 1002.

Figure 11A:
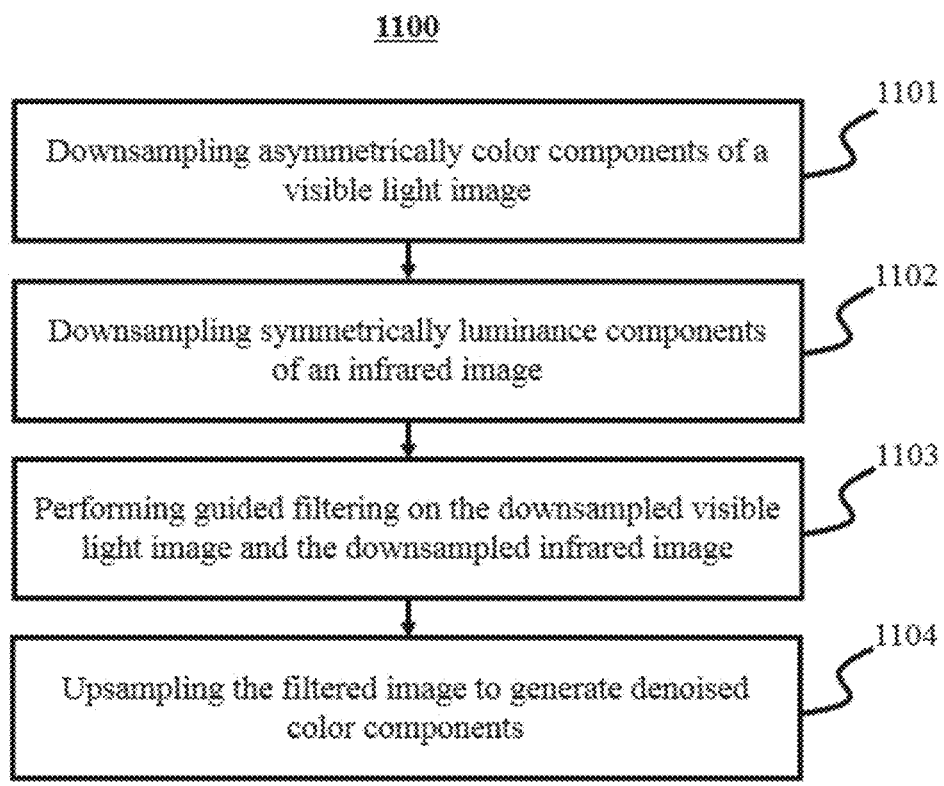
FIG. 11A is a flowchart illustrating an exemplary process of color filtering on a visible light image according to some embodiments of the present disclosure.

FIG. 11A is a flowchart illustrating an exemplary process for color filtering on a visible light image according to some embodiments of the present disclosure. The color filtering process may include downsampling, filtering, upsampling, etc. The process may be performed by the color filtering unit 530, which in turn may be implemented on a computing device as illustrated in FIG. 2 or a mobile device as illustrated in FIG. 3.

Figure 11B:
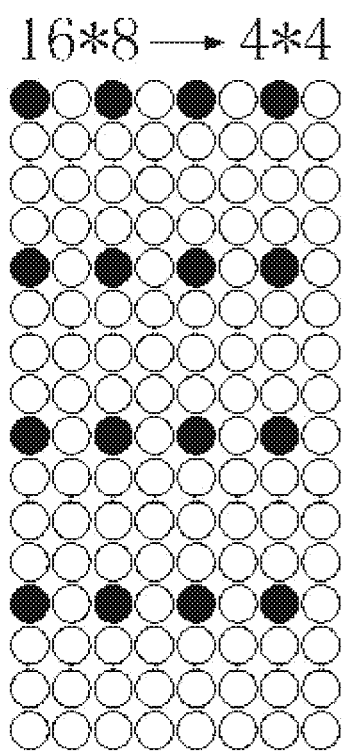
FIG. 11B illustrates an example of asymmetrically downsampling the color components of a visible light image according to some embodiments of the present disclosure.

In 1101, the color components of the visible light image may be downsampled. In some embodiments, the color components of the visible light image may be in the form of a matrix. The number of rows and the number of columns of the matrix may be determined based on the format of the visible light image. In some embodiments, the matrix may have the same number of rows and columns (e.g., 3 rows and 3 columns). In some embodiments, the matrix may have different numbers of rows and columns (e.g., 3 rows and 4 columns). In this situation, the matrix may be asymmetrically downsampled. For example, the color components of the visible light image may have 16 rows and 8 columns that form a 16*8 matrix as shown in FIG. 11B. After the downsampling, the 16*8 matrix may be converted into a 4*4 matrix. As shown in the figure, the pixels marked by the black color may be sampled. The rest pixels marked by the white color may be discarded. In this way, the issue of different sizes between the color components of the visible light image and the luminance components of the infrared image may be solved. In some embodiments, the matrix including the color components of the visible light image may have a same number of rows and columns. The matrix may be symmetrically downsampled.

In 1102, the luminance components of the infrared image may be downsampled. In some embodiments, the matrix may have a same number of rows and columns. The matrix may be symmetrically downsampled. For example, the luminance components of the infrared image may have 12 rows and 12 columns that form a 12*12 matrix. After the symmetrical downsampling, the matrix may be converted into a 4*4 matrix whose size is the same as the downsampled color components of the visible light image. In some embodiments, the matrix including the luminance components of the infrared image may have different numbers of rows and columns. The matrix may be asymmetrically downsampled such that the size of the matrix is the same as the downsampled color components of the visible light image.

In 1103, the guided filtering may be performed on the downsampled color components of the visible light image based on the downsampled luminance components of the infrared image. Herein, the downsampled luminance components of the infrared image may be a guidance image, or referred to as a reference image. Some features of the guidance image may be used to modify the other image. By way of the guided filtering, the color of the visible light image may be determined based on the downsampled color components of the visible light image, and the luminance of the visible light image may be determined based on the downsampled luminance components of the infrared image.

Figure 11C:
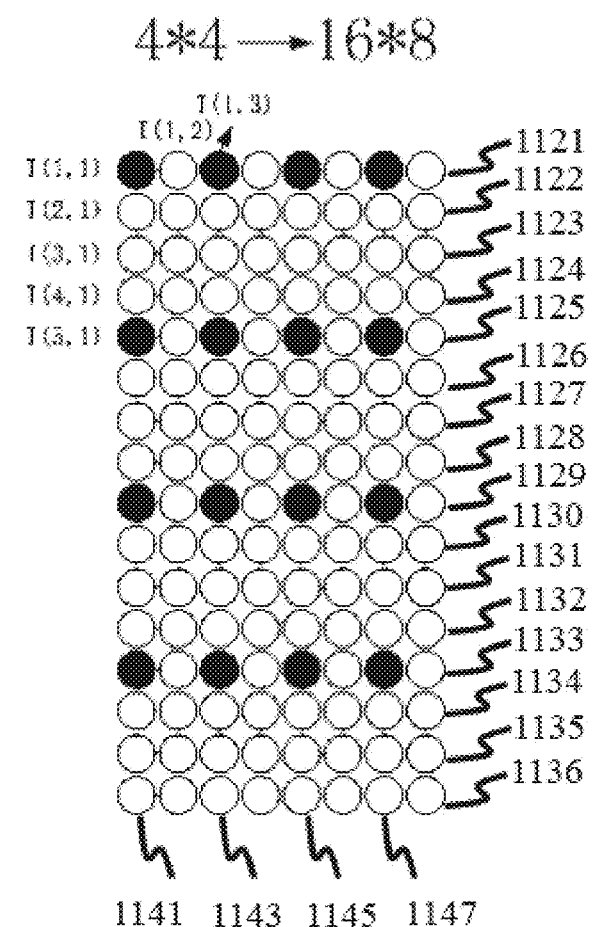
FIG. 11C illustrates an example of asymmetrically upsampling the processed color components of a visible light image according to some embodiments of the present disclosure.

In 1104, the color components of the filtered visible light image may be upsampled. In some embodiments, the color components of the filtered visible light image with downsampled color components may be symmetrically or asymmetrically upsampled. In some embodiments, the upsampled color components may be a new matrix that has the same size as the color components before the downsampling. For example, the color components of the filtered visible light image may have 4 rows and 4 columns that form a 4*4 matrix. After the asymmetrical upsampling, the 4*4 matrix may be converted into a new 16*8 matrix shown in FIG. 11C. As shown in the figure, the pixels marked with the black color in FIG. 11B may be maintained. And the rest pixels marked with white color may be determined by a weighted average algorithm and inserted into the 4*4 matrix to form a new 16*8 matrix. As an example, values of the pixels in rows 1121, 1125, 1129, and 1133 may be firstly determined based on the values of the pixels marked with black color according to equations:

$$I(1,2)=\tfrac{1}{2}I(1,1)+\tfrac{1}{2}I(1,3), \tag{22}$$

$$I(1,4)=\tfrac{1}{2}I(1,3)+\tfrac{1}{2}I(1,5), \tag{23}$$

$$I(1,6)=\tfrac{1}{2}I(1,5)+\tfrac{1}{2}I(1,7), \tag{24}$$

$$I(1,8)=\tfrac{1}{2}I(1,7). \tag{25}$$

After the values of pixels in rows 1121, 1125, 1129, and 1133 of the new 16*8 matrix are determined, values of pixels in other rows may be determined accordingly. Taking rows 1122, 1123, and 1124 as an example, values of pixels in their respective rows may be determined and inserted into rows 1122, 1123, and 1124 according to equations:

$$I(2,1)=\tfrac{3}{4}I(1,1)+\tfrac{1}{4}I(5,1), \tag{26}$$

$$I(3,1)=\tfrac{3}{4}I(1,1)+\tfrac{1}{4}I(5,1), \tag{27}$$

$$I(4,1)=\tfrac{1}{4}I(1,1)+\tfrac{3}{4}I(5,1). \tag{28}$$

Values of pixels in rows 1126, 1127, and 1128, and 1130, 1131, and 1132 may be determined in a similar way. Values of pixels in rows 1134, 1135, and 1136 may be equal to that of row 1133. In this way, the color components of the filtered visible light image with a 4*4 matrix may be upsampled into denoised color components with a 16*8 matrix. The denoised color components of the visible light image may have reduced noise compared to the color components of the visible light image before denoising.

It should be noted that the above description of the process 1100 is merely provided for the purposes of illustration, and not intended to limit the scope of the present disclosure. For persons having ordinary skills in the art, various variations and modifications may be performed in the light of the present disclosure. For example, in 1104, values of pixels in columns such as columns 1141, 1143, 1145, and 1147 may be firstly determined and inserted into columns 1141, 1143, 1145, and 1147 in the FIG. 11C. And then values of pixels in other columns may be determined and inserted based on the determined values of pixels in the other columns in a similar way.

Figure 12:
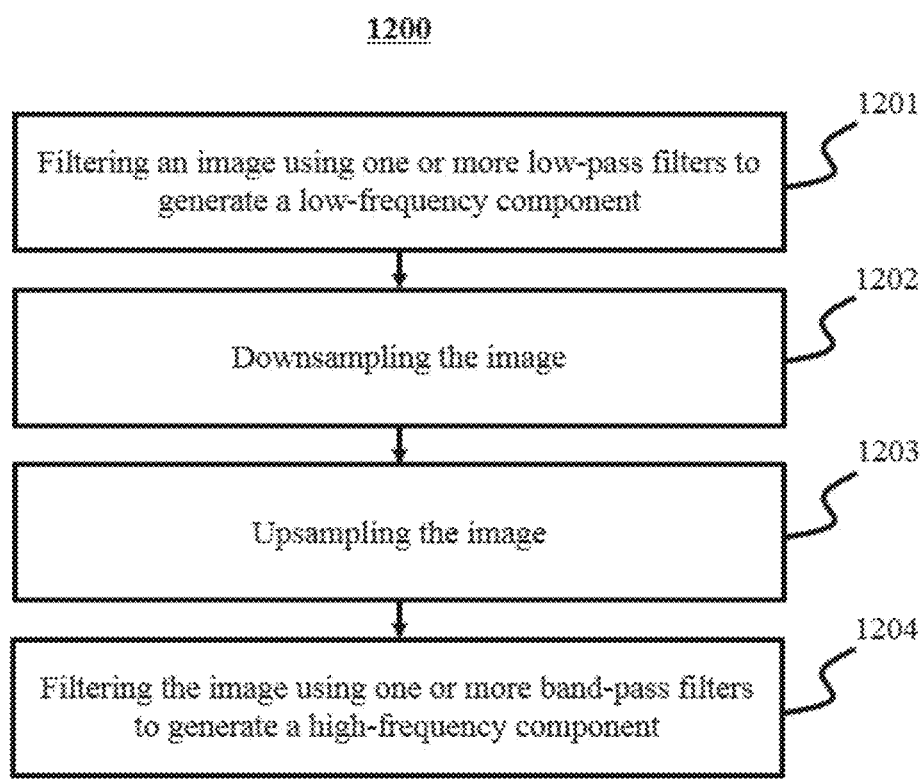
FIG. 12 is a flowchart illustrating an exemplary process for pyramid decomposition according to some embodiments of the present disclosure.

FIG. 12 is a flowchart illustrating an exemplary process for pyramid decomposition according to some embodiments of the present disclosure. The process may be performed by the decomposition module 430, which in turn may be implemented on a computing device as illustrated in FIG. 2 or a mobile device as illustrated in FIG. 3.

In 1201, an image may be filtered by one or more low-pass filters. The image may be a visible light image, an infrared image, or the like, or any combination thereof. In some embodiments, the filtering may be performed by the low-pass filtering unit 610. For example, the low-pass filtering unit 610 may perform a Gauss low-pass filtering on a visible light image. The filtering may be a convolution operation on the visible light image matrix. Related description may be found elsewhere in the present disclosure. See, for example, the description of the low-pass filtering unit 610.

In 1202, the filtered image may be downsampled. In some embodiments, the downsampling may be performed by the downsampling unit 620. For instance, in a two dimensional matrix, the downsampling may divide the sampling rate by the downsampling factor 2, and sample interlacedly on the filtered image matrix to generate a quartered constringent matrix. Related description may be found elsewhere in the present disclosure. See, for example, the description of the downsampling unit 620.

In 1203, the downsampled image may be upsampled. In some embodiments, the upsampling process may be performed by the upsampling unit 630. The upsampling may be achieved by inserting zeros interlacedly into the downsampled image matrix to generate a supplementary image matrix. Related description may be found elsewhere in the present disclosure. See, for example, the description of the upsampling unit 630.

In 1204, the upsampled image may be filtered by one or more band-pass filters to generate a high-frequency component image. In some embodiments, the filtering process may be performed by the band-pass filtering unit 640. For example, the filtering may be a convolution operation followed by a matrix operation to generate the high-frequency component image. Related description may be found elsewhere in the present disclosure. See, for example, the description of the band-pass filtering unit 640.

It should be understood that the steps as shown in FIG. 12 is for illustrative purposes, but not intended to limit the protection scope of the present disclosure. In some embodiments, the process may be accomplished with one or more additional steps not described, and/or without one or more of the steps discussed above. For example, in 1204, one or more filters may be instead of a combination of one or more low-pass filters and high-pass filters.

Figure 13:
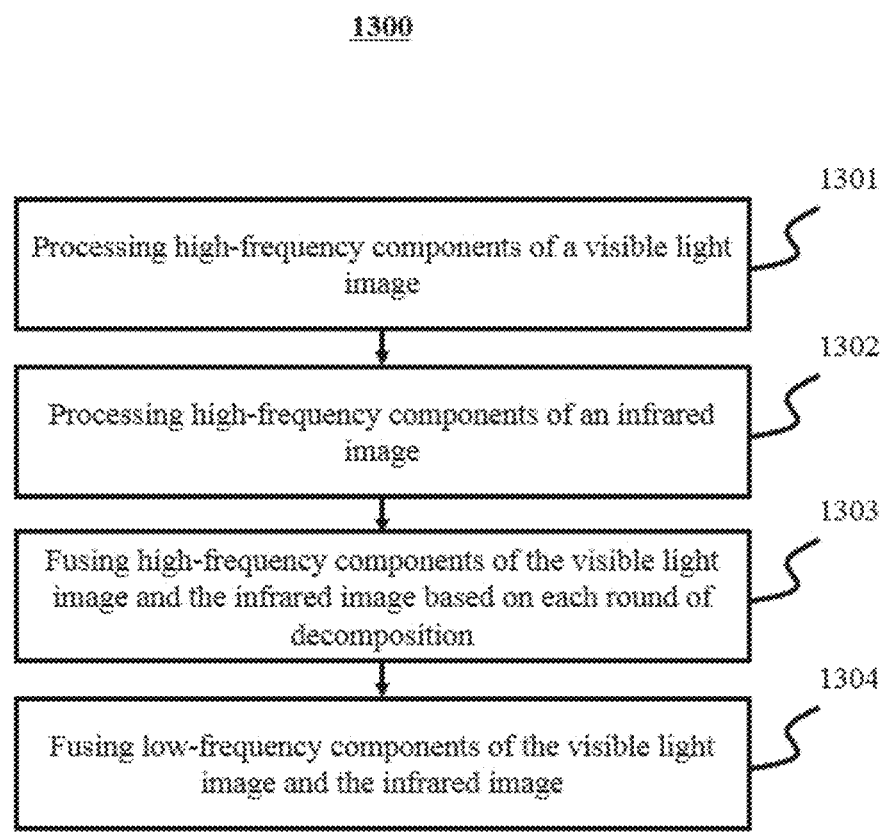
FIG. 13 is a flowchart illustrating an exemplary image components processing process according to some embodiments of the present disclosure.

FIG. 13 is a flowchart illustrating a process for an exemplary image components processing according to some embodiments of the present disclosure. The image components may be generated by the decomposition module 430, which in turn may be implemented on a computing device as illustrated in FIG. 2 or a mobile device as illustrated in FIG. 3. The image components processing may be performed by the processing module 440, which in turn may be implemented on a computing device as illustrated in FIG. 2 or a mobile device as illustrated in FIG. 3. In some embodiments, the image components may be a high-frequency component of a visible light image and/or that of an infrared image. The image components may be a low-frequency component of a visible light image and/or that of an infrared image.

In 1301, high-frequency components of a visible light image may be processed. The processing of the high-frequency components of the visible light image may be performed by the high-frequency component processing unit 710. The processing may include coefficient mapping and/or median filtering in order to remove noises from the visible light image. Related description may be found elsewhere in the present disclosure. See, for example, the description of the high-frequency component processing unit 710.

In 1302, high-frequency components of an infrared image may be processed. The processing of the high-frequency components of the infrared image may be performed by the high-frequency component processing unit 710. The processing may include an amplification of the high-frequency components of the infrared image in order to increase the contribution of the high-frequency components of the infrared information to the fused image. Related description may be found elsewhere in the present disclosure. See, for example, the description of the high-frequency component processing unit 710.

In 1303, high-frequency components of the visible light image and the infrared image may be fused. The fusion of the high-frequency component of the visible light image and the high-frequency component of the infrared image may be performed by the high-frequency component fusion unit 720. The fusion strategy may depend on the region energy and the region correlation of the visible light image and the infrared image. Related description may be found elsewhere in the present disclosure. See, for example, the description of the high-frequency component fusion unit 720.

In 1304, low-frequency components of the visible light image and the infrared image may be fused. The fusion of low-frequency components of the visible light image and the infrared image may be performed by the low-frequency component fusion unit 730. The fusion may depend on the luminance of the infrared image. If the luminance of the infrared image is abnormal, the low-frequency components of the infrared image may be ignored. Otherwise, the fusion may be a smoothing process. Related description may be found elsewhere in the present disclosure. See, for example, the description of the low-frequency component fusion unit 730.

It should be understood that the steps as shown in FIG. 13 is for illustrative purposes, but not intended to limit the protection scope of the present disclosure. In some embodiments, the process may be accomplished with one or more additional steps not described, and/or without one or more of the steps discussed above. Additionally, the order in which the operations of the process as illustrated in FIG. 13 is not intended to be limiting. For example, the processes recorded in 1301 and 1302, performed by the high-frequency component processing unit 710 may be performed in a reversed order or simultaneously because they are based on different components.

Figure 14:
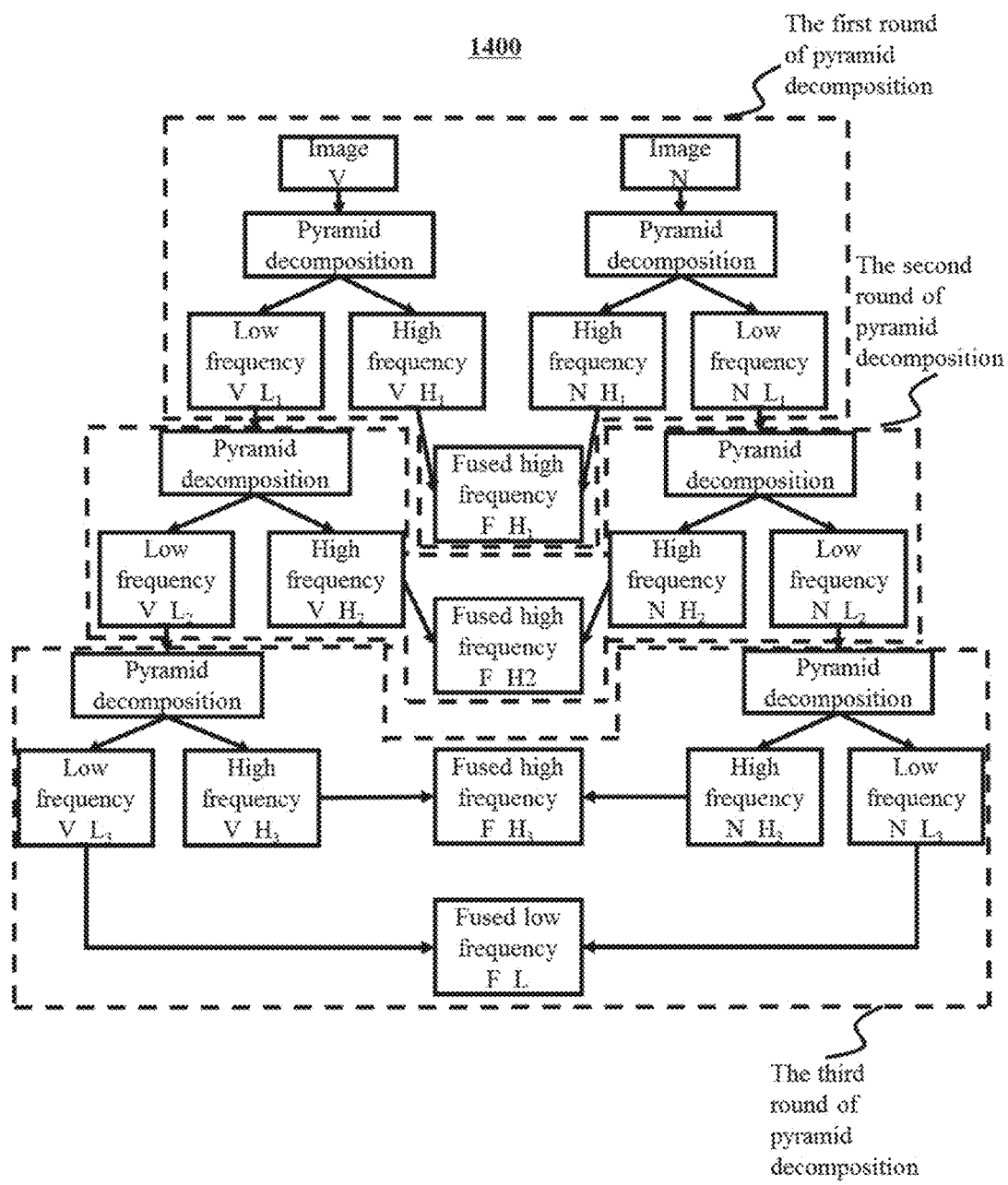
FIG. 14 illustrates pyramid decomposition according to some embodiments of the present disclosure.

FIG. 14 illustrates pyramid decomposition according to some embodiments of the present disclosure. The process may be repeated by the decomposition module 430 and the processing module 440, which in turn may be implemented on a computing device as illustrated in FIG. 2 or a mobile device as illustrated in FIG. 3. In some embodiments, the decomposition module 430 may receive a visible light image V and an infrared image N. A first round of pyramid decomposition may be performed on the visible light image and the infrared image, respectively. A first low-frequency component $V\_L_1$ of the visible light image and a first high-frequency component $V\_H_1$ of the visible light image may be generated in the first round of pyramid decomposition of the visible light image V. A first low-frequency component $N\_L_1$ of the infrared image and a first high-frequency component $N\_H_1$ of the infrared image may be generated in the first round of pyramid decomposition of the infrared image N. The high-frequency components $V\_H_1$ and $N\_H_1$ may be processed and fused by, for example, the processing module 440, to generate a fused high-frequency component $F\_H_1$.

In the second round of pyramid decomposition, the low-frequency components $V\_L_1$ of the visible light image and the low-frequency components $N\_L_1$ of the infrared image may be decomposed. The processing and fusing technique may be disclosed in the processing module 440. The decomposition module 430 may perform the second round of pyramid decomposition on the low-frequency components $V\_L_1$ of the visible light image and the low-frequency components $N\_L_1$ of the infrared image. A second low-frequency component $V\_L_2$ of the visible light image and a second high-frequency component $V\_H_2$ of the visible light image may be generated in the second round of pyramid decomposition of the low-frequency components $V\_L_1$ of the visible light image. A second low-frequency component $N\_L_2$ of the infrared image and a second high-frequency component $N\_H_2$ of the infrared image may be generated in the second round of pyramid decomposition of the low-frequency components $N\_L_1$ of the infrared image . . . .

Similarly, the $n^{th}$ round of pyramid decomposition on the low-frequency components $V\_L_{n-1}$ of the visible light image and the low-frequency components $N\_L_{n-1}$ of the infrared image. An $n^{th}$ low-frequency component $V\_L_n$ of the visible light image and an $n^{th}$ high-frequency component $V\_H_n$ of the visible light image may be generated in the second round of pyramid decomposition of the low-frequency components $V\_L_{n-1}$ of the visible light image. An $n^{th}$ low-frequency component $N\_L_n$ of the infrared image and an $n^{th}$ high-frequency component $N\_H_n$ of the infrared image may be generated in the $n^{th}$ round of pyramid decomposition of the low-frequency components $N\_L_{n-1}$ of the infrared image, where n is an integer not less than one.

After the multiple rounds of decomposition, a plurality of fused high-frequency component $F\_H_1, F\_H_2 \ldots F\_H_n$ may be determined by, for example, the processing module 440, based on the high-frequency components of the visible light image and the infrared image. A fused low-frequency component $F\_L$ may be generated based on the low-frequency component $V\_L_n$ of the visible light image and the low-frequency component $N\_L_n$ of the infrared image generated in the last round of pyramid decomposition. For example, three rounds of ordered pyramid decomposition of the visible light image and the infrared image may be performed. Three low-frequency components of the visible light image $V\_L_1, V\_L_2, V\_L_3$, three high-frequency components of the visible light image $V\_H_1, V\_H_2, V\_H_3$, three low-frequency components of the infrared image $N\_L_1, N\_L_2, N\_L_3$, and three high-frequency components of the infrared image $N\_H_1, N\_H_2$ and $N\_H_3$ may be generated. Meanwhile, three fused high-frequency components $F\_H_1, F\_H_2, F\_H_3$ and a fused low-frequency component $F\_L$ may be generated. Related description about the fusing may be found elsewhere in the present disclosure. See, for example, the description of the decomposition module 430 and the processing module 440.

Figure 15:
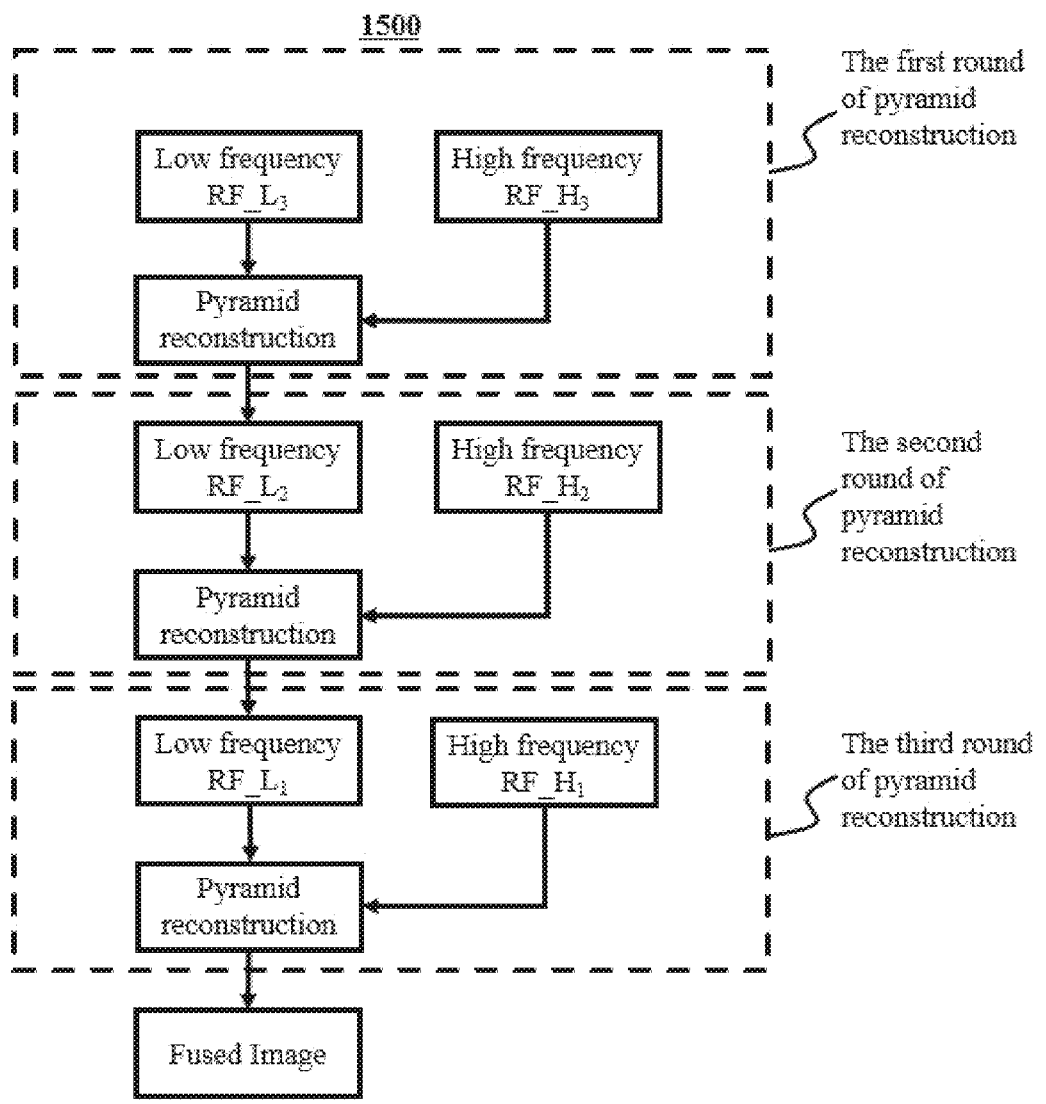
FIG. 15 is a flowchart illustrating a technique of reconstruction to obtain a fused image according to some embodiments of the present disclosure.

FIG. 15 is a flowchart illustrating a technique of reconstruction to obtain a fused image according to some embodiments of the present disclosure. The reconstruction may be performed by the reconstruction module 450, which in turn may be implemented on a computing device as illustrated in FIG. 2 or a mobile device as illustrated in FIG. 3. In some embodiments, the reconstruction may be a reverse process with respect to the decomposition described in connection with the decomposition module 430. The multiple rounds of reconstruction may be a reverse process with respect to the multiple rounds of the pyramid decomposition.

Merely by way of example, a fused low-frequency component $RF\_L_n$ may be upsampled by inserting zeros to the $RF\_L_n$ to generate an upsampled fused low-frequency component $RF\_L_n^0$. Then a convolution operation may be performed on 4*W (the value of W as defined in the description regarding the decomposition module 430) and $RF\_L_n^0$. The result of the convolution operation $4W \cdot RF\_L_n^0$ may be multiplied by a high-frequency component $RF\_H_n$ to generate a reconstruction component $RF\_L_{n-1}$, determined as:

$$RF\_L_{n-1} = 4W \cdot RF\_L_n^0 \cdot RF\_H_n. \tag{29}$$

In some embodiments, the first $RF\_L_n$ may be determined as the fused low-frequency component $F\_L$. $RF\_H_n$ may depend on the fused high-frequency component $F\_H_n$, determined as:

$$RF\_H_n = F\_H_n + 1, \tag{30}$$

where n is the number of rounds of the pyramid reconstruction, the same as used in the multiple rounds of pyramid decomposition. For example, if n=3, three rounds of reverse pyramid reconstruction may be performed. The third low-frequency component $RF\_L_3$ and the third high-frequency component $RF\_H_3$ may be fused in the first round of pyramid reconstruction. Then the second fused low-frequency component $RF\_L_2$ and the second high-frequency component $RF\_H_2$ may be fused in the second round of pyramid reconstruction. At last, the first fused low-frequency component $RF\_L_1$ and the first high-frequency component $RF\_H_1$ may be fused in the third round of pyramid reconstruction to generate a fused image.

Having thus described the basic concepts, it may be rather apparent to those skilled in the art after reading this detailed disclosure that the foregoing detailed disclosure is intended to be presented by way of example only and is not limiting. Various alterations, improvements, and modifications may occur and are intended to those skilled in the art, though not expressly stated herein. These alterations, improvements, and modifications are intended to be suggested by this disclosure, and are within the spirit and scope of the exemplary embodiments of this disclosure.

Moreover, certain terminology has been used to describe embodiments of the present disclosure. For example, the terms "one embodiment," "an embodiment," and/or "some embodiments" mean that a particular feature, structure or characteristic described in connection with the embodiment is included in at least one embodiment of the present disclosure. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments of the present disclosure.

Further, it will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, micro-code, etc.) or combining software and hardware implementation that may all generally be referred to herein as a "block," "module," "engine," "unit," "component," or "system." Furthermore, aspects of the present disclosure may take the form of a computer program product embodied in one or more computer readable media having computer readable program code embodied thereon.

We claim:

1. An image fusion system, comprising:
a processor coupled to a storage; and
the storage configured to store instructions, the instructions, when executed by the processor, causing the image fusion system to effectuate a method comprising:
obtaining a visible light image and an infrared image relating to a same scene;
performing a first decomposition to the visible light image to obtain a first high-frequency component of the visible light image and a first low-frequency component of the visible light image;
performing a first decomposition to the infrared image to obtain a first high-frequency component of the infrared image and a first low-frequency component of the infrared image;
fusing the first high-frequency component of the visible light image and the first high-frequency component of the infrared image based on a first algorithm to generate a first fused high-frequency component;
fusing, based on a threshold and a difference between the first low-frequency component of the visible light image and the first low-frequency component of the infrared image, the first low-frequency component of the visible light image and the first low-frequency component of the infrared image to generate a first fused low-frequency component; and
performing reconstruction based on the first fused high-frequency component and the first fused low-frequency component to generate a fused image.

2. The system of claim 1, wherein the image fusion system is further caused to effectuate the method comprising:
preprocessing the visible light image and the infrared image, wherein the preprocessing comprises:
registering the visible light image and the infrared image;
performing haze removal on the visible light image; and
performing color filtering on the visible light image.

3. The system of claim 2, wherein the performing haze removal on the visible light image comprises:
determining a dark channel matrix;
determining an atmospheric light;
determining an initial transmittance based on the dark channel matrix and the atmospheric light;
determining a bright area to obtain an optimized transmittance based on the initial transmittance; and
performing the haze removal based on the optimized transmittance.

4. The system of claim 1, wherein the first decomposition is pyramid decomposition.

5. The system of claim 4, wherein the pyramid decomposition comprises:
performing low-pass filtering on a subject image to obtain a filtered image;
downsampling the filtered image to obtain a downsampled image;
upsampling the downsampled image to obtain an upsampled image; and
performing band-pass filtering on the upsampled image to obtain a decomposed subject image.

6. The system of claim 5, the subject image comprising the first high-frequency component of the visible light image, the first low-frequency component of the visible light image, the first high-frequency component of the infrared image, or the first low-frequency component of the infrared image.

7. The system of claim 1, wherein the fusing of the first low-frequency component of the visible light image and the first low-frequency component of the infrared image comprises:
determining whether the difference exceeds the threshold;
designating, in response to the determination that the difference exceeds the threshold, the low-frequency component of the visible light image as a first fused low-frequency component; and
determining, in response to the determination that the difference is lower than the threshold, the first fused low-frequency component based on a second algorithm.

8. The system of claim 7, the fusing the first high-frequency component of the visible light image and the first high-frequency component of the infrared image comprises:
determining the first fused high-frequency component based on a third algorithm.

9. The system of claim 8, wherein the performing the reconstruction comprises:
performing an inverse pyramid decomposition based on the first fused low-frequency component and the first fused high-frequency component.

10. The system of claim 1, wherein the image fusion system is further caused to effectuate the method comprising:
filtering the first high-frequency component of the visible light image by performing one or both of mapping and median filtering.

11. The system of claim 10, wherein the image fusion system is further caused to effectuate the method comprising:
amplifying the first high-frequency component of the infrared image.

12. The system of claim 1, wherein the image fusion system is further caused to effectuate the method comprising:
performing a second decomposition to the first low-frequency component of the visible light image to obtain a second high-frequency component of the visible light image and a second low-frequency component of the visible light image;
performing a second decomposition to the first low-frequency component of the infrared image to obtain a second high-frequency component of the infrared image and a second low-frequency component of the infrared image; and
fusing the second high-frequency component of the visible light image and the second high-frequency component of the infrared image based on the first algorithm to generate a second fused high-frequency component.

13. The system of claim 12, the performing the reconstruction further including:
fusing the second low-frequency component of the visible light image and the second low-frequency component of the infrared image based on a second algorithm to generate a second fused low-frequency component; and generating the fused image based on the first fused high-frequency component, the second fused high-frequency component, and the second fused low-frequency component.

14. An image fusion method, comprising:
obtaining a visible light image and an infrared image relating to a same scene;
performing a first decomposition to the visible light image to obtain a first high-frequency component of the visible light image and a first low-frequency component of the visible light image;
performing a first decomposition to the infrared image to obtain a first high-frequency component of the infrared image and a first low-frequency component of the infrared image;
fusing the first high-frequency component of the visible light image and the first high-frequency component of the infrared image based on a first algorithm to generate a first fused high-frequency component;
fusing, based on a threshold and a difference between the first low-frequency component of the visible light image and the first low-frequency component of the infrared image, the first low-frequency component of the visible light image and the first low-frequency component of the infrared image to generate a first fused low-frequency component; and
performing reconstruction based on the first fused high-frequency component and the first fused low-frequency component to generate a fused image.

15. The method of claim 14, wherein the first decomposition is pyramid decomposition.

16. The method of claim 15, wherein the pyramid decomposition comprises performing low-pass filtering on a subject image to obtain a filtered image;
downsampling the filtered image to obtain a downsampled image;
upsampling the downsampled image to obtain an upsampled image; and
performing band-pass filtering on the upsampled image to obtain a decomposed subject image.

17. The method of claim 14, the method further comprising:
filtering the first high-frequency component of the visible light image by performing mapping and median filtering.

18. The method of claim 14, the method further comprising:
amplifying the first high-frequency component of the infrared image.

19. The method of claim 14, the method further comprising:
performing a second decomposition to the first low-frequency component of the visible light image to obtain a second high-frequency component of the visible light image and a second low-frequency component of the visible light image;
performing a second decomposition to the first low-frequency component of the infrared image to obtain a second high-frequency component of the infrared image and a second low-frequency component of the infrared image; and
fusing the second high-frequency component of the visible light image and the second high-frequency component of the infrared image based on the first algorithm to generate a second fused high-frequency component.

20. A non-transitory computer readable medium storing instructions, the instructions, when executed by a computing device, causing the computing device to implement a method, comprising:
obtaining a visible light image and an infrared image relating to a same scene;
performing a first decomposition to the visible light image to obtain a first high-frequency component of the visible light image and a first low-frequency component of the visible light image;
performing a first decomposition to the infrared image to obtain a first high-frequency component of the infrared image and a first low-frequency component of the infrared image;
fusing the first high-frequency component of the visible light image and the first high-frequency component of the infrared image based on a first algorithm to generate a first fused high-frequency component;
fusing, based on a threshold and a difference between the first low-frequency component of the visible light image and the first low-frequency component of the infrared image, the first low-frequency component of the visible light image and the first low-frequency component of the infrared image to generate a first fused low-frequency component; and
performing reconstruction based on the first fused high-frequency component and the first fused low-frequency component to generate a fused image.

* * * * *